(12) United States Patent
Sanchez Garcia et al.

(10) Patent No.: US 8,853,317 B2
(45) Date of Patent: Oct. 7, 2014

(54) COATING COMPRISING MULTIPOPULATION FUMED SILICA PARTICLES

(75) Inventors: Angelica M. Sanchez Garcia, Somerville, MA (US); Brian G. Prevo, Arlington, MA (US); Joseph B. Carroll, Glen Allen, VA (US)

(73) Assignee: Cabot Corporation, Boston, MA (US)

( * ) Notice: Subject to any disclaimer, the term of this patent is extended or adjusted under 35 U.S.C. 154(b) by 617 days.

(21) Appl. No.: 13/037,105

(22) Filed: Feb. 28, 2011

(65) Prior Publication Data

US 2012/0142837 A1    Jun. 7, 2012

Related U.S. Application Data

(60) Provisional application No. 61/309,289, filed on Mar. 1, 2010.

(51) Int. Cl.
*B60C 1/00* (2006.01)
*C01B 33/18* (2006.01)
*C09C 1/30* (2006.01)

(52) U.S. Cl.
CPC ........... *C09C 1/3081* (2013.01); *C01P 2004/62* (2013.01); *C01P 2004/45* (2013.01); *C01B 33/18* (2013.01); *C01P 2006/12* (2013.01)
USPC ........................................................ 524/493

(58) Field of Classification Search
USPC ........................................................ 524/493
See application file for complete search history.

(56) References Cited

U.S. PATENT DOCUMENTS

| 2003/0077533 | A1  | 4/2003 | Murota et al. |
| 2008/0090070 | A1  | 4/2008 | Muraguchi et al. |
| 2009/0120328 | A1* | 5/2009 | Michael et al. ............... 106/481 |
| 2009/0221735 | A1  | 9/2009 | Ferencz |

FOREIGN PATENT DOCUMENTS

JP    2005-154222    6/2005

OTHER PUBLICATIONS

Intenational Search Report and the Written Opionion of the International Searching Authority, or the Declaration for International Application No. PCT/US2011/026504, mailed on Nov. 21, 2011.

* cited by examiner

*Primary Examiner* — Ling Choi
*Assistant Examiner* — Thuy-Ai Nguyen

(57) ABSTRACT

The invention provides a coating comprising fumed silica particles, wherein the fumed silica particles comprise aggregates of primary particles, wherein (a) the primary particles have a bimodal or multimodal particle size distribution representing populations of particles having at least a smallest average primary particle size and a largest average primary particle size, and wherein primary particles having a smaller average primary particle size are attached to primary particles having a larger average primary particle size, or (b) the aggregates have a bi-modal or multi-modal aggregate size distribution, and a carrier. The invention additionally provides a method for preparing a coated article comprising the coating.

25 Claims, 13 Drawing Sheets

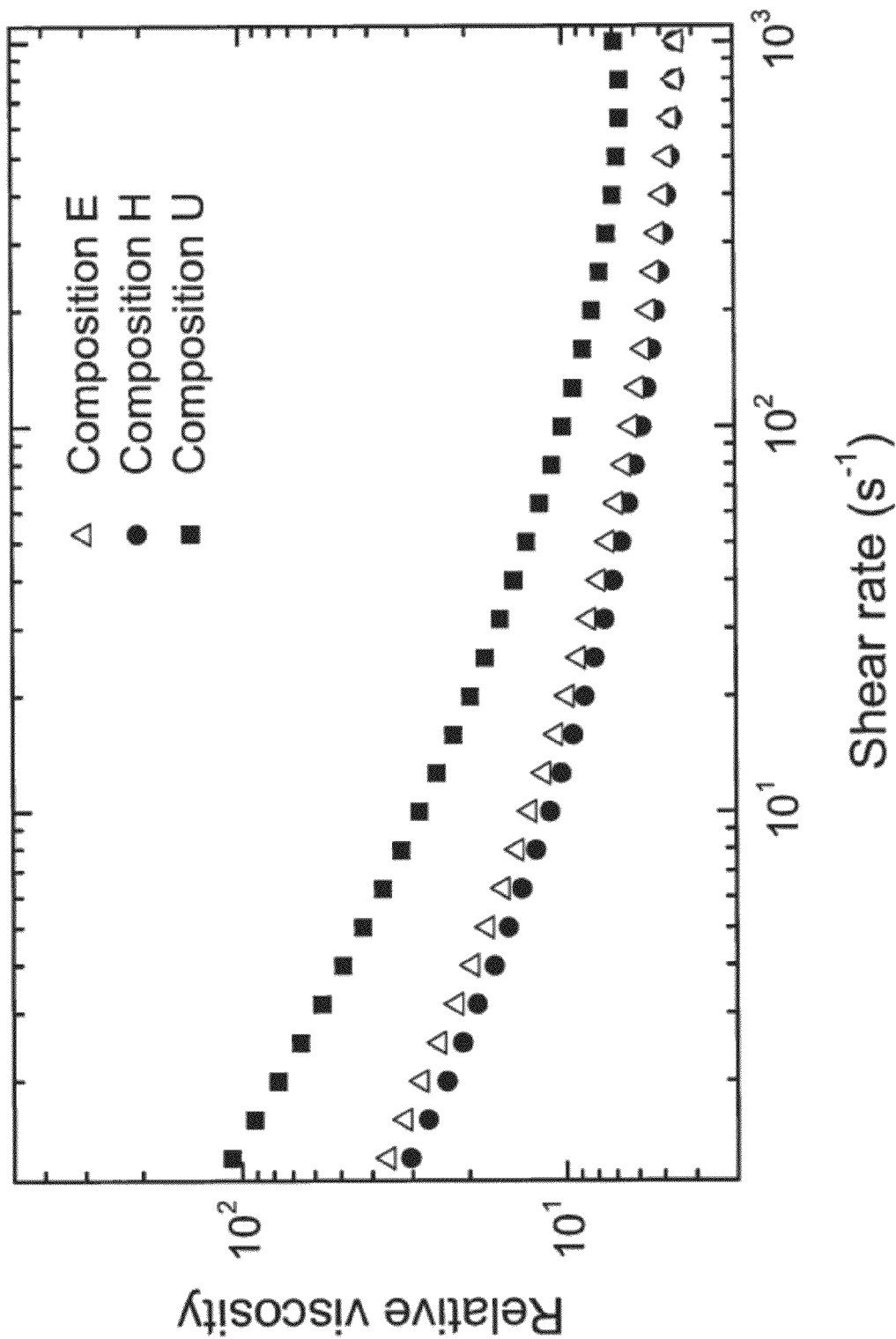

ized. Known methods for making superhydrophobic materials include forming flat surface arrays of vertically aligned polytetrafluoroethylene coated carbon nanotubes, forming periodic arrays of micropillars on a flat surface using microelectronics based photolithography and hydrophobically modifying their surfaces, depositing self aligned polymer nanospheres onto surfaces, soft lithographic stamping or embossing of such structures into hydrophobic polymers, and using porous or roughened fluorinated polymers as superhydrophobic coating materials.
COATING COMPRISING MULTIPOPULATION FUMED SILICA PARTICLES

RELATED APPLICATIONS

The present application claims the benefit under 35 U.S.C. §119(e) of U.S. Application Ser. No. 61/309,289, filed Mar. 1, 2010 and entitled COATING COMPRISING MULTIPOPULATION FUMED SILICA PARTICLES, the content of which is incorporated herein by reference in its entirety.

BACKGROUND OF THE INVENTION

Many surfaces are typically wetted by liquids. The degree of wetting is a function of the interplay between the forces of cohesion in the liquid and the forces of adhesion between the liquid and surface.

In many instances, wetting of surfaces is undesirable. For example, wetting of surfaces with water results in retention of water droplets on the surfaces. Upon evaporation of the water, solids dissolved or suspended in the water remain as unsightly residues on the surface. Wetting of surfaces with water also can act as a trigger for corrosion or for infestation of the surface with microorganisms, such as bacteria. Wetting surfaces can also lead to excess ice build up on surfaces in colder climates. In the context of packaging and storage vessels, wetting of interior surfaces results in retention of liquid within the packaging or storage vessel, leading to loss of liquid on transfer, or hold up in injection molding or related applications.

It is known that the wettability by hydrophilic liquids may be reduced by use of hydrophobic coatings on surfaces. Suitable coating materials include polysiloxanes and perfluorinated polymers, such as polytetrafluoroethylene (Teflon™). The coating reduces the forces of adhesion between liquid and the wetted surface.

In addition, it is known that the microscopic and nanoscopic architecture of the surface affects the adhesion of liquid droplets to surfaces. The leaf surfaces of lotus leaves and other plants have long been known to be superhydrophobic. These leaf surfaces are covered with microbumps (called papillae), which, in turn, are covered with hydrophobic wax with nanoscale roughness. These surfaces exhibit so-called "reentrant" surface topography that traps air underneath droplets, which serves to make macroscopically large contact angles by disrupting the droplet contact line (see, e.g., Öner et al., Langmuir, 16(20): 7777-7782 (2000); Tuteja et al., MRS Bulletin 33: 752 (2008)). Mimicry of the leaf surface structure has led to development of synthetic hydrophobic surface coatings having micro- and nanoscale surface structures formed thereon with a height and spacing on the order of 1-150 microns, where structural spacings in the range of 1-50 microns have shown the most consistent synthetic superhydrophobic effects (Öner, 2000). Known methods for making superhydrophobic materials include forming flat surface arrays of vertically aligned polytetrafluoroethylene coated carbon nanotubes, forming periodic arrays of micropillars on a flat surface using microelectronics based photolithography and hydrophobically modifying their surfaces, depositing self aligned polymer nanospheres onto surfaces, soft lithographic stamping or embossing of such structures into hydrophobic polymers, and using porous or roughened fluorinated polymers as superhydrophobic coating materials.

However, many of these superhydrophobic materials are costly to prepare and are insufficiently robust for use in real world applications. Thus, there remains a need in the art for improved superhydrophobic coatings.

BRIEF SUMMARY OF THE INVENTION

The invention provides a coating comprising (a) fumed silica particles, wherein the fumed silica particles comprise aggregates of primary particles, wherein the primary particles have a bimodal or multimodal particle size distribution representing populations of particles having at least a smallest average primary particle size and a largest average primary particle size, and wherein primary particles having a smaller average primary particle size are attached to primary particles having a larger average primary particle size, and (b) a carrier, wherein at least a portion of the fumed silica particles are accessible to a surface of the coating.

The invention also provides a coating comprising (a) fumed silica particles, wherein the fumed silica particles comprise aggregates of primary particles, wherein the aggregates have a bi-modal or multi-modal aggregate size distribution, and (b) a carrier, wherein at least a portion of the fumed silica particles are accessible to a surface of the coating.

The invention further provides a method for preparing a coated article, wherein the method comprises (i) combining (a) fumed silica particles, wherein the fumed silica particles comprise aggregates of primary particles, wherein the primary particles have a bimodal or multimodal particle size distribution representing populations of particles having at least a smallest average primary particle size and a largest average primary particle size, and wherein primary particles having a smaller average primary particle size are attached to primary particles having a larger average primary particle size, and (b) a carrier or a carrier precursor, to produce a coating composition, (ii) providing an article, and (iii) applying the coating composition to at least a portion of the article to produce the coated article.

The invention also provides a method for preparing a coated article, wherein the method comprises (i) combining (a) fumed silica particles, wherein the fumed silica particles comprise aggregates of primary particles, wherein the aggregates have a bi-modal or multi-modal aggregate size distribution, and (b) a carrier or a carrier precursor, to produce a coating composition, (ii) providing an article, and (iii) applying the coating composition to at least a portion of the article to produce the coated article.

The invention additionally provides an article comprising a coating comprising (a) fumed silica particles, wherein the fumed silica particles comprise aggregates of primary particles, wherein the primary particles have a bimodal or multimodal particle size distribution representing populations of particles having at least a smallest average primary particle size and a largest average primary particle size, and wherein primary particles having a smaller average primary particle size are attached to primary particles having a larger average primary particle size, and (b) a carrier, wherein at least a portion of the fumed silica particles are accessible to a surface of the coating.

The invention additionally provides an article comprising a coating comprising (a) fumed silica particles, wherein the fumed silica particles comprise aggregates of primary particles, wherein the aggregates have a bi-modal or multi-modal aggregate size distribution, and (b) a carrier, wherein at least a portion of the fumed silica particles are accessible to a surface of the coating.

According to an aspect of the invention, a coating is provided. The coating comprises (a) fumed silica particles, wherein the fumed silica particles comprise aggregates of primary particles, wherein the primary particles have a bimodal or multimodal particle size distribution representing populations of particles having at least a smallest average primary particle size and a largest average primary particle size, and wherein primary particles having a smaller average primary particle size are attached to primary particles having a larger average primary particle size, and (b) a carrier, wherein at least a portion of the fumed silica particles are accessible to a surface of the coating. In some embodiments, the smallest average primary particle size is about 0.05 to about 0.5 times the largest average primary particle size. In certain embodiments, a number ratio of the population of primary particles represented by the smallest average primary particle size to the population of primary particles represented by the largest average primary particle size is about 1:1 to about 50:1. In some embodiments, the fumed silica particles are treated with a surface treating agent. In some embodiments, the surface treating agent is a silane coupling agent selected from the group consisting of cyclic silazanes, organopolysiloxanes, organosiloxanes, organosilanes, halogenorganopolysiloxanes, halogen organosiloxanes, halogenorganosilazanes, and halogenorganosilanes. In certain embodiments, the surface treating agent is hexamethyldisilazane. In some embodiments, the carrier is a polymer resin. In some embodiments, the coating comprises about 0.1 wt. % to about 90 wt. % of the fumed silica particles.

According to another aspect of the invention, a coating composition useful for producing the coating of any aforementioned aspect or embodiment of the invention is provided. In some embodiments, the coating composition further comprises a vehicle. In certain embodiments, the coating composition comprises at least one polymerizable monomer, and the at least one polymerizable monomer is polymerized to form the carrier.

According to an aspect of the invention, articles comprising the coating of any of the aforementioned aspects or embodiments of the invention are provided. In some embodiments, droplets of water having a volume of about 1 µL to about 10 µL deposited on the surface thereof exhibit a contact angle of about 80° to about 140°. In certain embodiments, droplets of water having a volume of about 1 µL to about 10 µL deposited on the surface of the article exhibit a contact angle of about 100° to about 120°. In some embodiments, the coating exhibits a tilt angle of about 5° or less.

According to another aspect of the invention, an article comprising any of the aforementioned coatings of the invention is provided. In certain embodiments, droplets of water having a volume of about 1 µL to about 10 µL deposited on the surface of the article exhibit a contact angle of about 130° to about 180°. In some embodiments, droplets of water having a volume of about 1 µL to about 10 µL deposited on the surface of the article exhibit a contact angle of about 150° to about 170°. In some embodiments, the coating exhibits a tilt angle of about 5° or less.

According to yet another aspect of the invention, methods for preparing a coated article are provided. The method comprises (i) combining (a) fumed silica particles, wherein the fumed silica particles comprise aggregates of primary particles, wherein the primary particles have a bimodal or multimodal particle size distribution representing populations of particles having at least a smallest average primary particle size and a largest average primary particle size, and wherein the primary particles have at least two different average primary particle sizes, and wherein primary particles having a smaller average primary particle size are attached to primary particles having a larger average primary particle size, and (b) a carrier or a carrier precursor, to produce a coating composition, (ii) providing an article, and (iii) applying the coating composition to at least a portion of the article to produce the coated article. In certain embodiments, the smallest average primary particle size is about 0.05 to about 0.5 times the largest average primary particle size. In some embodiments, a number ratio of the population of primary particles represented by the smallest average primary particle size to the population of primary particles represented by the largest average primary particle size is about 1:1 to about 50:1. In certain embodiments, the fumed silica particles are treated with a surface treating agent. In some embodiments, the surface treating agent is a silane coupling agent selected from the group consisting of cyclic silazanes, organopolysiloxanes, organosiloxanes, organosilanes, halogenorganopolysiloxanes, halogen organosiloxanes, halogenorganosilazanes, and halogenorganosilanes. In some embodiments, the surface treating agent is hexamethyldisilazane. In certain embodiments, the carrier is a polymer resin. In some embodiments, the carrier precursor is at least one polymerizable monomer, and the at least one polymerizable monomer is polymerized to form the carrier.

According to yet another aspect of the invention, a coating is provided. The coating comprises (a) fumed silica particles, wherein the fumed silica particles comprise aggregates of primary particles, wherein the aggregates have a bi-modal or multi-modal aggregate size distribution, and (b) a carrier, wherein at least a portion of the fumed silica particles are accessible to a surface of the coating. In some embodiments, the fumed silica particles are treated with a surface treating agent. In certain embodiments, the surface treating agent is a silane coupling agent selected from the group consisting of cyclic silazanes, organopolysiloxanes, organosiloxanes, organosilanes, halogenorganopolysiloxanes, halogen organosiloxanes, halogenorganosilazanes, and halogenorganosilanes. In some embodiments, the surface treating agent is hexamethyldisilazane. In some embodiments, the carrier is a polymer resin. In certain embodiments, the coating comprises about 0.1 wt. % to about 90 wt. % of the fumed silica particles.

According to another aspect of the invention, a coating composition useful for producing a coating of any of the aforementioned aspects and embodiments of the invention is provided. In some embodiments, the coating composition further comprises a vehicle. In some embodiments, the coating composition comprises at least one polymerizable monomer, and the at least one polymerizable monomer is polymerized to form the carrier.

According to yet another aspect of the invention, an article comprising the coating of any of the aforementioned aspects or embodiments of the invention is provided. In some embodiments, droplets of water having a volume of about 1 µL to about 10 µL deposited on the surface of the article exhibit a contact angle of about 80° to about 140°. In certain embodiments, droplets of water having a volume of about 1 µL to about 10 µL deposited on the surface of the article exhibit a contact angle of about 100° to about 120°. In some embodiments, the coating exhibits a tilt angle of about 5° or less.

According to yet another aspect of the invention, an article comprising the coating of any aforementioned aspect or embodiment of the invention is provided. In certain embodiments, droplets of water having a volume of about 1 µL to about 10 µL deposited on the surface of the article exhibit a contact angle of about 130° to about 180°. In some embodiments, droplets of water having a volume of about 1 µL to about 10 µL deposited on the surface of the article exhibit a contact angle of about 150° to about 170°. In some embodiments, the coating exhibits a tilt angle of about 5° or less.

According to another aspect of the invention, a method for preparing a coated article is provided. The method comprises (i) combining (a) fumed silica particles, wherein the fumed silica particles comprise aggregates of primary particles, wherein the primary particles have a bimodal or multimodal particle size distribution representing populations of particles having at least a smallest average primary particle size and a largest average primary particle size, and wherein the primary particles have at least two different average primary particle sizes, and wherein primary particles having a smaller average primary particle size are attached to primary particles having a larger average primary particle size, and (b) a carrier or a carrier precursor, to produce a coating composition, (ii) providing an article, and (iii) applying the coating composition to at least a portion of the article to produce the coated article. In certain embodiments, the fumed silica particles are treated with a surface treating agent. In some embodiments, the surface treating agent is a silane coupling agent selected from the group consisting of cyclic silazanes, organopolysiloxanes, organosiloxanes, organosilanes, halogenorganopolysiloxanes, halogen organosiloxanes, halogenorganosilazanes, and halogenorganosilanes. In certain embodiments, the surface treating agent is hexamethyldisilazane. In some embodiments, the carrier is a polymer resin. In certain embodiments, the carrier precursor is at least one polymerizable monomer, and the at least one polymerizable monomer is polymerized to form the carrier.

BRIEF DESCRIPTION OF THE DRAWINGS

FIG. 12 is a representative flow curve where the relative viscosity of the coating dispersion is plotted against the shear rate for Compositions E and H of Example 4, and Composition U of Example 14.

DETAILED DESCRIPTION OF THE INVENTION

Figure 1:
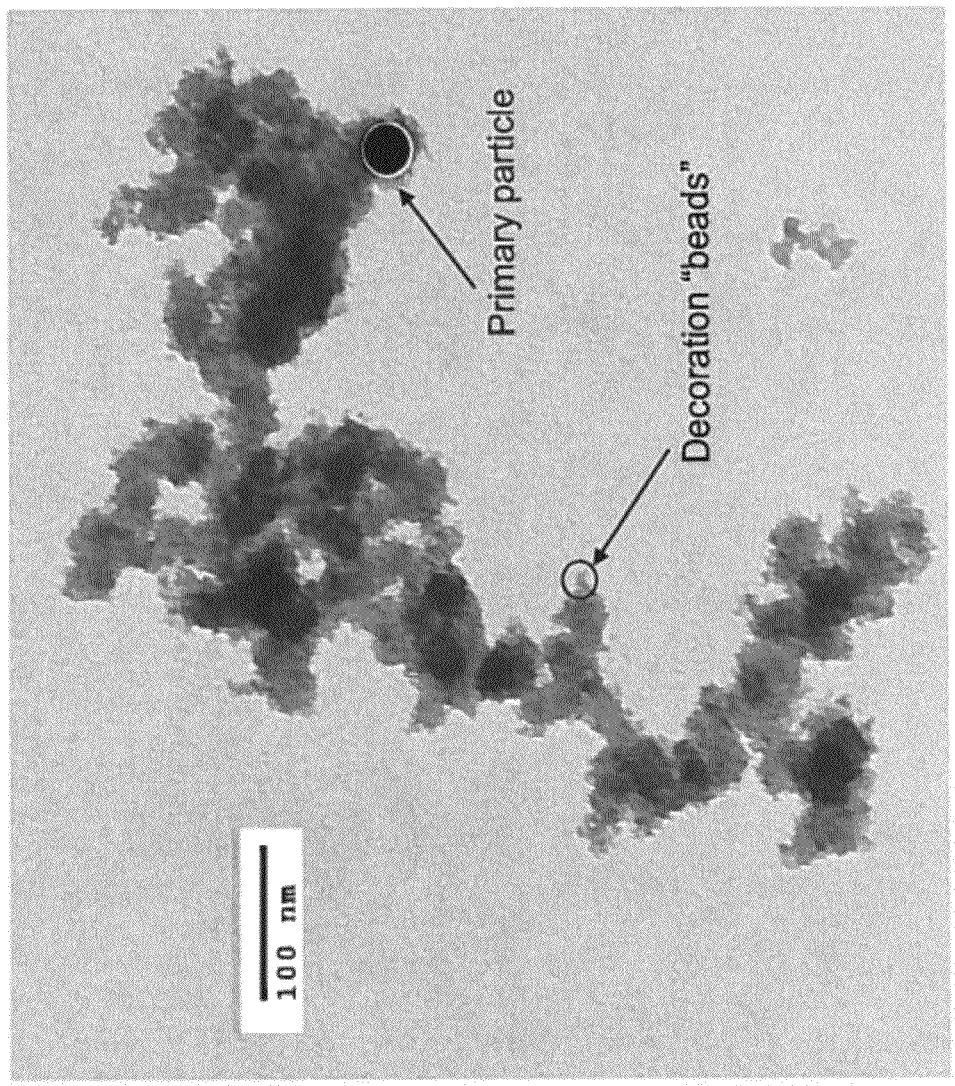
FIG. 1 is a first representative TEM image of an exemplary embodiment of multipopulation fumed silica useful in the invention and produced according to Example 1.

The invention provides a coating comprising (a) fumed silica particles, wherein the fumed silica particles comprise aggregates of primary particles, wherein the primary particles have a bimodal or multimodal particle size distribution representing populations of particles having at least a smallest average primary particle size and a largest average primary particle size, and wherein primary particles having a smaller average primary particle size are attached to primary particles having a larger average primary particle size, and (b) a carrier, wherein at least a portion of the fumed silica particles are accessible to a surface of the coating.

The invention also provides a coating comprising (a) fumed silica particles, wherein the fumed silica particles comprise aggregates of primary particles, wherein the aggregates have a bi-modal or multi-modal aggregate size distribution, and (b) a carrier, wherein at least a portion of the fumed silica particles are accessible to a surface of the coating. fumed silica comprising aggregates of primary particles having a bi-modal or multi-modal aggregate size distribution.

As used herein, fumed silica particles comprising aggregates of primary particles, wherein the primary particles have a bimodal or multimodal particle size distribution representing populations of particles having at least a smallest average primary particle size and a largest average primary particle size, and wherein primary particles having a smaller average primary particle size are attached to primary particles having a larger average primary particle size are referred to as "decorated" fumed silica particles. As used herein, fumed silica particles comprising aggregates of primary particles, wherein the aggregates have a bi-modal or multi-modal aggregate size distribution are referred to as "multimodal" fumed silica particles.

In an embodiment, the fumed silica particles comprises aggregates of primary particles, wherein the fumed silica particle comprise aggregates of primary particles, and wherein the primary particles have a bimodal or multimodal particle size distribution representing populations of particles having at least a smallest average primary particle size and a largest average primary particle size, and wherein primary particles having a smaller average primary particle size are attached to primary particles having a larger average primary particle size, directly and/or through other smaller particles. These aggregates are referred to herein as multipopulation or "decorated" fumed silica particles.

In an embodiment, fumed silica suitable for use in the coating described herein can be as described in International Patent Application No. PCT/US09/56064 and US Patent Application Publication No. US 2010/0059704, Ser. No. 12/205,643, the disclosure of each of which is incorporated herein in its entirety by reference. More specifically, fumed silica suitable for use in the coating described herein can be produced by a process comprising (a) providing a stream of a feedstock comprising a silica precursor, (b) providing a stream of combustible gas, (c) forming a stream of combusted gas with fumed silica particles suspended therein in a reactor, wherein the fumed silica particles comprise aggregates of primary particles, and wherein the aggregates are of a first aggregate size, by (c1) mixing the stream of the feedstock with the stream of combustible gas to form a stream of combustible gas with the silica precursor, and then combusting the stream of combustible gas with the silica precursor to form the stream of combusted gas with fumed silica particles having the first size suspended therein, (c2) combusting the stream of combustible gas to form a stream of combusted gas and then mixing the stream of the feedstock with the stream of the combusted gas to form a stream of combusted gas with the silica precursor suspended therein, which then forms fumed silica particles having the first aggregate size, or (c3) carrying out a combination of the foregoing items (c1) and (c2), (d) allowing contact among the fumed silica particles having the first aggregate size in the stream of combusted gas and introducing additional feedstock into the stream of combusted gas with the fumed silica particles having the first aggregate size suspended therein, thereby forming a stream of combusted gas with fumed silica particles having a second aggregate size suspended therein, the second aggregate size being larger than the first aggregate size, and (e) recovering the fumed silica particles having the second aggregate size from the stream of combusted gas.

The stream of a feedstock comprising a silica precursor can be formed in any suitable manner. The silica precursor can be any suitable silica precursor or combination of silica precursors. For example, the silica precursor can be a silicon halide that is converted to silica under the conditions of the inventive process. Suitable silica precursors include, but are not limited to, chlorosilanes, alkyl-chlorosilanes, siloxanes, or other substituted silanes.

The stream of combustible gas can be formed in any suitable manner. The combustible gas can be any suitable combustible gas or combination of combustible gases. The combustible gas typically includes a fuel and an oxidant. The fuel can be any suitable fuel, such as hydrogen ($H_2$), carbon monoxide (CO), and methane ($CH_4$). The fuel preferably is hydrogen or has a high content of hydrogen-containing components, such as light hydrocarbons. Suitable hydrocarbons include, but are not limited to, natural gas, methane, acetylene, alcohol, kerosene, and mixtures thereof. As used herein, the term "natural gas" refers to a mixture of methane ($CH_4$), ethane ($C_2H_6$), propane ($C_3H_8$), butane ($C_4H_{10}$), and nitrogen. In some forms, natural gas may further comprise relatively small amounts of helium. As utilized herein, the term "kerosene" refers to a mixture of petroleum hydrocarbons, which is obtained during the fractional distillation of petroleum. The oxidant can be any suitable oxidant, such as air and/or oxygen.

A diluent optionally can be combined with the silica precursor, fuel, and/or oxidant. The diluent typically comprises one or more substantially non-oxidizing or inert gases, such as nitrogen, carbon dioxide, argon, etc.

The stream of combustible gas is combusted, typically in a suitable apparatus, such as a reactor. The reactor can be of any suitable configuration. For example, any heated, cooled, or refractory-lined furnace with an optionally controlled quench system can be used. The combustion of the combustible gas results in the formation of a flame and stream of combusted gas flowing downstream of the flame. The stream of combustible gas results in a flame desirably having an adiabatic temperature of 1000° C. to 2200° C., preferably 1400° C. to 1900° C.

The stream of a feedstock comprising a silica precursor is combined with the stream of combustible gas, the stream of combusted gas, or both the stream of combustible gas and the stream of combusted gas. The silica precursor is in the form of either vapor or fine droplets (e.g., an aerosol) in the stream of a combustible gas and/or the stream of combusted gas and ultimately is subjected to a high temperature resulting from the combustion of the combustible gas, thereby converting the silica precursor to fumed silica particles that are suspended in the stream of combusted gas, wherein the fumed silica particles comprise aggregates of primary particles, and the aggregates are of a first size.

The inventive process allows contact among the fumed silica particles having the first aggregate size in the stream of combusted gas and provides for introduction of additional feedstock into the stream of combusted gas with the fumed silica particles suspended therein. In that manner, a stream of combusted gas with fumed silica particles having a second aggregate size suspended therein is formed, wherein the second aggregate size is larger than the first aggregate size.

The resulting fumed silica particles are recovered from the stream of combusted gas in any suitable manner. Typically, the fumed silica particles having the second aggregate size are cooled, e.g., by quenching with air or other gases.

In practice, a portion of the total amount of a feedstock is fed to the reactor at a suitable position downstream of the initial, fumed-silica-producing flame. The silica precursor reacts with the surface of the fumed silica particles produced from the flame, fusing them together into larger aggregates. The process also, under appropriate conditions, can lower the coefficient of structure of the final fumed silica aggregates. The amount of the additional feedstock introduced downstream may be between 0% and 75% of the total feedstock by mass, preferably between 10% and 50% on a mass basis. The additional feedstock can be introduced by any suitable means at one or more suitable locations with respect to the main flame (e.g., the initial particle-producing flame). If the reactor has a typical diameter $d_{reactor}$, then the additional feedstock introduction typically is 1 $d_{reactor}$ to 120 $d_{reactor}$ downstream, e.g., 2 $d_{reactor}$ to 24 $d_{reactor}$ downstream, of the main flame. A flow reactor, whether or not it is cylindrical, can have a characteristic transverse dimension, such as a hydraulic diameter, and this dimension can be substituted for $d_{reactor}$ in scaling the position of downstream introduction. The additional feedstock can be introduced along with additional combustible gas containing, for example, hydrogen-containing fuel, oxidant, and diluent. The additional feedstock can be introduced into the reactor coaxially, transversely or tangentially.

A process variable that can effectively control the increase in aggregate size is the relative amount of feedstock introduced downstream. A greater proportion of feedstock fed downstream of the initial particle-producing flame provides a greater increase in the aggregate size, e.g., above the level expected for a conventional fumed silica of the same surface area. When a chlorosilane feedstock is used (e.g., silicon tetrachloride, trichlorosilane, or methyltrichlorosilane), another process variable that can effectively control the aggregate size increase is the relative stoichiometry of hydrogen introduced with the chlorosilane, i.e., the introduced theoretical $H_2$ ratio (%) that can be defined as: introduced theoretical $H_2$=(moles of $H_2$ introduced)/(0.5× moles of Cl atoms introduced).

The introduced theoretical $H_2$ ratio represents the amount of introduced hydrogen available to react with the chlorine atoms of the introduced feedstock, relative to the amount required to react away all of the chlorine atoms in the introduced material. When the introduced theoretical $H_2$ ratio is above 100%, then enough hydrogen has been introduced to react with all of the introduced chlorine to form HCl. When the introduced theoretical $H_2$ ratio is less than 100%, then water vapor, present in the mixture of initial silica and combusted gas, must supply some of the hydrogen for converting the chlorine to HCl. Lower values of the introduced theoretical $H_2$ ratio promote more aggregate size growth.

The surface area of the initial fumed silica may increase or decrease after introduction of the additional feedstock downstream of the initial particle-producing flame, depending on the starting surface area and the introduced theoretical $H_2$ ratio. The surface area change does not depend on the amount of feedstock introduced downstream. Low starting surface areas usually yield a surface area increase (a negative surface area loss). Low values of the introduced theoretical $H_2$ ratio likewise increase the likelihood of a small surface area loss or a surface area increase.

Figure 2:
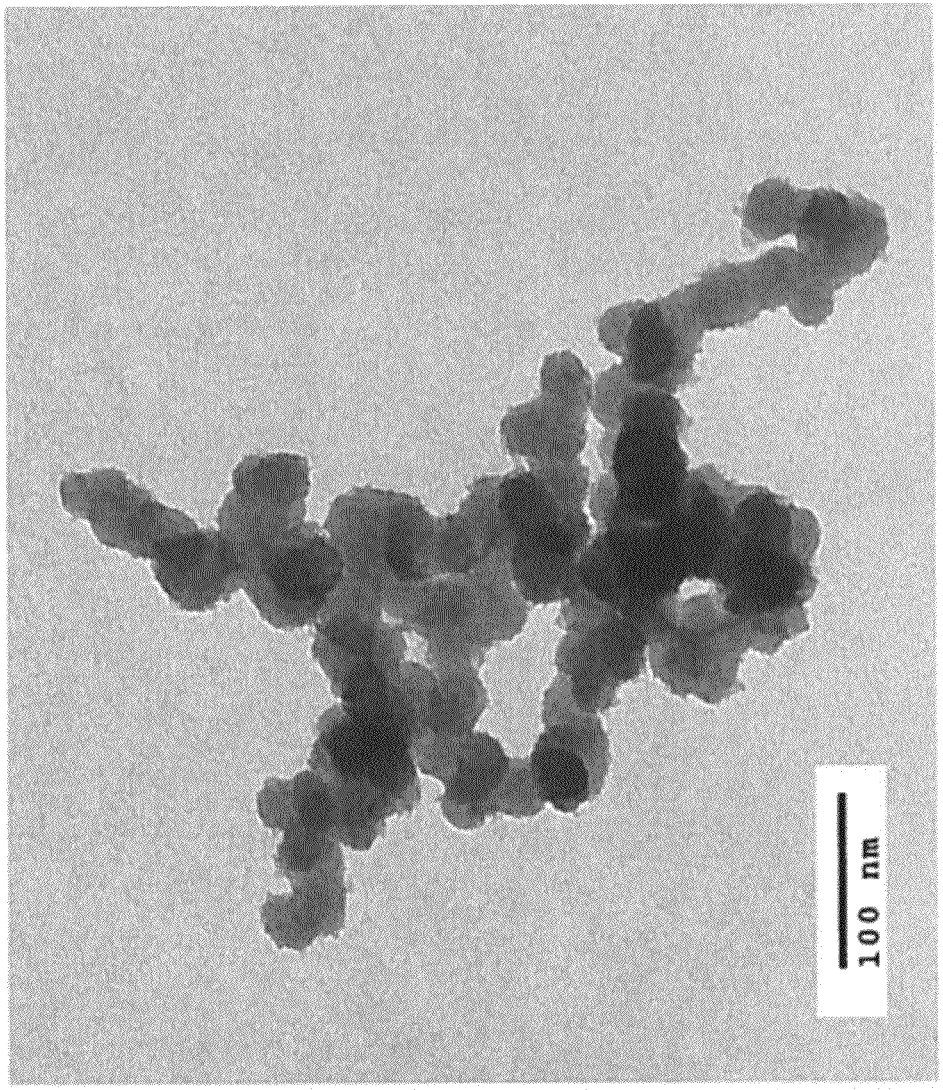
FIG. 2 is a second representative TEM image of an exemplary embodiment of multipopulation fumed silica useful in the invention and produced according to Example 1.
Figure 3:
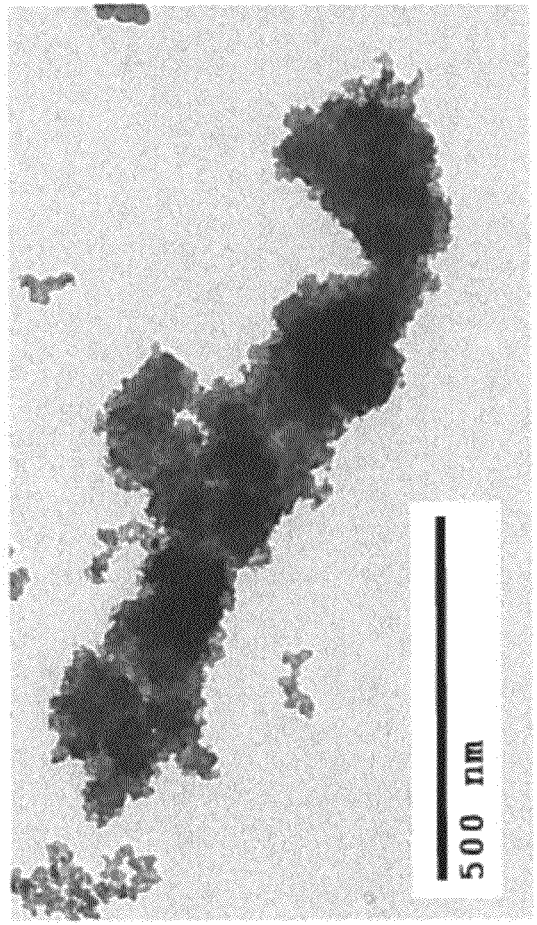
FIG. 3 is a third representative TEM image of an exemplary embodiment of multipopulation fumed silica useful in the invention and produced according to Example 1.

The aforesaid process can produce fumed silica comprising aggregates having at least two primary particle sizes (i.e., at least a bi-modal primary particle size distribution and including a multi-modal primary particle size distribution). Such fumed silica typically comprises larger primary particles with smaller primary particles attached to the larger primary particles, directly and/or through other smaller particles. FIGS. 1-3 are representative TEM images of such fumed silicas. The circled portion of FIG. 1 shows an example of smaller primary particles, referred to as "decoration beads", that are attached to larger primary particles.

In particular, the fumed silica can have at least a bi-modal particle size distribution representing populations of particles having at least two different average primary particle sizes with a smallest average primary particle size and a largest primary particle size. The smallest average primary particle size can be about 0.05 or more, about 0.1 or more, about 0.15 or more, or about 0.2 or more times the largest average primary particle size. Alternatively, or in addition, the smallest average primary particle size can be about 0.5 or less, about 0.45 or less, about 0.4 or less, or about 0.3 or less times the largest average primary particle size. Thus, the smallest average primary particle size relative to the largest average primary particle can be bounded by any two of the aforementioned endpoints. For example, the smallest average primary particle size can be about 0.5 to about 0.4 times, about 0.05 to about 0.3 times, or about 0.1 to about 0.45 times the largest average primary particle size. In an embodiment, the inventive coating comprises the aforesaid fumed silica particles, wherein the smallest average particle size is about 0.05 to about 0.5 times the largest average primary particle size.

The number ratio of the population of primary particles represented by the smallest average primary particle size to the population of primary particles represented by the largest average primary particle size with respect to the larger primary particles can be any suitable value. The number ratio of the population of primary particles represented by the smallest average primary particle size to the population of primary particles represented by the largest average primary particle size with respect to the larger primary particles can be about 1:1 or more, about 2:1 or more, about 3:1 or more, 5:1 or more, about 10:1 or more, or about 20:1 or more. Alternatively, or in addition, the number ratio of the population of primary particles represented by the smallest average primary particle size to the population of primary particles represented by the largest average primary particle size with respect to the larger primary particles can be about 50:1 or less, about 40:1 or less, about 30:1 or less, about 20:1 or less, or about 10:1 or less. Thus, the number ratio of the population of primary particles represented by the smallest average primary particle size to the population of primary particles represented by the largest average primary particle size with respect to the larger primary particles can be bounded by any two of the aforementioned endpoints. For example, the number ratio of the population of primary particles represented by the smallest average primary particle size to the population of primary particles represented by the largest average primary particle size with respect to the larger primary particles can be about 5:1 to about 40:1, 10:1 to about 50:1, or about 10:1 to about 30:1. In an embodiment, the inventive coating comprises the aforesaid fumed silica particles wherein the number ratio of the population of primary particles represented by the smallest average primary particle size to the population of primary particles represented by the largest average primary particle size with respect to the larger primary particles is about 1:1 to about 50:1.

Such fumed silica comprising aggregates of primary particles, wherein the primary particles have at least a bi-modal particle size distribution representing populations of primary particles having at least two different average primary particle sizes, wherein primary particles having a smaller average primary particle size are attached to primary particles having a larger average primary particle size, can be prepared as demonstrated in Example 1. FIGS. 1-3 depict representative TEM images of the fumed silicas prepared in accordance with Example 1 and clearly show that the resulting fumed silicas are fumed silicas comprising aggregates of primary particles, wherein the primary particles have at least a bi-modal particle size distribution representing populations of primary particles having at least two different average primary particle sizes. Fumed silica comprising aggregates of primary particles, wherein the primary particles have at least a bi-modal particle size distribution representing populations of primary particles having at least two different average primary particle sizes, wherein primary particles having a smaller average primary particle size are attached to primary particles having a larger average primary particle size, can be produced by selection of the appropriate process variables as is evident from the aforementioned example and the results thereof, such as a relatively large proportion of feedstock introduced downstream (e.g., more than 20%), a low introduced theoretical $H_2$ ratio (e.g., less than 100%), and/or a relatively low fumed silica starting (i.e., immediately prior to post-quench aggregate growth) surface area (e.g., less than 320 m$^2$/g).

In an embodiment, fumed silica suitable for use in the coating described herein can be as described in International Patent Application No. PCT/US09/56064 and US Patent Application Publication No. US 2010/0059704, Ser. No. 12/205,643, the disclosure of each of which is incorporated herein in its entirety by reference. More specifically, fumed silica suitable for use in the coating described herein can be produced by controlling and desirably modifying the temperature-time profile, or history, of the fumed silica/combusted gas mixture to allow for post-quench aggregate growth. The temperature-time profile, or history, of the particles in the reactor is modified in order to keep the fumed silica aggregates hot enough to fuse together, thereby producing larger aggregates than are produced in a conventional process. This is in contrast to the conventional process, wherein the fumed silica and combusted gas mixture exits the flame region and then is allowed to cool to an arbitrary temperature by a combination of radiation, convection, and mixing with colder gas, as is well known in the art. The fumed silica of this embodiment comprises aggregates of primary particles having a bi-modal or multi-modal aggregate size distribution.

Specifically, for use in the second embodiment of the inventive coating, the fumed silica/combusted gas mixture is first quenched, preferably to a temperature below 1700° C., preferably within approximately 100 milliseconds of the formation of the fumed silica. The temperature of the fumed silica/combusted gas mixture then is elevated to, or maintained at, a suitable temperature high enough to allow smaller silica aggregates to fuse together into larger aggregates in a temperature elevation/maintenance step. When the fumed silica is pure (i.e., not doped with other elements), this temperature that is high enough to allow smaller silica aggregates to fuse together into larger aggregates, i.e., the temperature facilitating post-quench aggregate growth, can be above 1000° C., for example, above 1350° C., but below 1700° C., and maintained for up to 2 seconds. When the fumed silica is doped with other elements, the temperature facilitating post-quench aggregate growth will differ depending on the nature and extent of the dopant(s). After this temperature elevation/maintenance step, the fumed silica/combusted gas mixture desirably is cooled to below 1000° C. within 2 seconds in order to halt the fusing process. Finally, the fumed silica/combusted gas mixture is further cooled, as necessary, to allow separation of the fumed silica particles from the stream of combusted gas, as is commonly practiced in the art.

The temperature and/or the duration of the temperature facilitating post-quench aggregate growth are adjusted so as to avoid sintering away more surface area than desired. The application of additional heat sinters away the surface area of the fumed silica to some extent, but if the material is held at high temperature for too long (the duration depends on the temperature), the final product is excessively reduced in surface area, and its aggregate size stays within the aggregate sizes of the population of conventional fumed silicas. The optimal time and temperature for the post-quench aggregate growth depends on the variation rate of sintering of the silica or the silica-dopant system with temperature. Without wishing to be bound by any particular theory, it is believed that the temperature utilized in the temperature elevation/maintenance step for post-quench aggregate growth should be barely sufficient to maintain the particles in a viscous state without coalescing faster than their collision rate.

The increase in aggregate size resulting from post-quench aggregate growth can be any suitable amount. For example, the aggregate size increase can be about 5% or more, about 10% or more, about 15% or more, or about 20% or more.

The elevation or maintenance of the temperature for the post-quench aggregate growth can be achieved by at least one of (1) use of refractory insulation in the reactor to maintain the temperature of the stream of the combusted gas/fumed silica mixture for a desired period of time, (2) active heating of the reactor, e.g., the walls of the reactor, (3) introduction of additional combustible gas, and (4) introduction of cooling gas or liquid.

If additional combustible gas is used to elevate or maintain the temperature of the fumed silica/combusted gas mixture, then the additional combustible gas can be fed into the stream of combusted gas and fumed silica at any suitable point, or at multiple points, and in any suitable manner. When the additional combustible gas is ignited and combusted, the temperature of the aggregates of the fumed silica suspended in the stream of combusted gas is increased, thereby facilitating the fusion of the aggregates upon contact with each other in the stream of combusted gas. The position of the introduction and the temperature of the additional combustible gas can be adjusted depending on the desired aggregate size and final surface area of the resulting fumed silica particles.

When the introduction of combustible gas is the principal or only method used to provide post-quench aggregate control within the fumed silica/combusted gas mixture, then the most important process variables are (a) the temperature to which the initial mixture of combusted gas and fumed silica is allowed to cool before introduction of the additional combustible gas, (b) the adiabatic temperature increase caused by the introduction of additional combustible gas, (c) the initial burner adiabatic temperature, calculated from thermodynamic data in a manner well-known in the art, (d) the type of fuel used, and (e) in some situations, the estimated temperature of the particles after introduction of the combustible gas.

When the introduction of additional combustible gas is the principal method used to provide post-quench aggregate growth within the fumed silica/combusted gas mixture, then the additional combustible gas may need to be sufficient to produce an adiabatic temperature increase of at least 100° C., for example, 150° C. to 400° C., to ensure that enough heat is delivered to the fumed silica/combusted gas mixture to cause a significant increase in aggregate size. The optimal amount of adiabatic temperature increase depends on the temperature to which the fumed silica/combusted gas mixture is initially quenched. A smaller adiabatic temperature increase may be required if the initial drop in temperature is relatively small, thereby leading to a relatively high initial post-quench temperature. If an insulated refractory section is used instead of the introduction of additional combustible gas to provide a sufficient temperature for post-quench aggregate growth, then the adiabatic temperature increase is not applicable. Furthermore, if a combination of refractory insulation and the introduction of additional combustible gas is used to elevate or maintain the temperature of the fumed silica/combusted gas mixture, then the adiabatic temperature increase is less important, inasmuch as less additional heat is required to effect post-quench aggregate growth.

The additional combustible gas can be fed into the stream of combusted gas in an amount of 1% to 100% of a total mass of material in the stream of combusted gas. The additional combustible gas desirably comprises fuel and oxidant, as well as optionally diluent, wherein the fuel and oxidant may be in any suitable ratio, e.g., a stoichiometric ratio of oxidant to fuel, in the additional combustible gas, of between 0% and 300%, preferably 0% to 60%, and more preferably 5% to 40%. Preferably, the additional combustible gas contains hydrogen.

The additional combustible gas desirably is fed into the stream of combusted gas and fumed silica, so as to result in elevating the estimated post-introduction temperature of the mixture above a critical minimum value. When the fumed silica is pure (i.e., not doped), this minimum temperature is at least 600° C. and typically approximately 1000° C., e.g., between 1000° C. and 1350° C. The estimated post-introduction temperature is calculated by first calculating the adiabatic temperature of the initial fumed silica/combusted gas mixture, in a manner well-known in the art. Then, the estimated temperature before introduction is calculated by estimating the heat loss that occurs as the mixture proceeds to the additional combustible gas introduction point. This heat loss is estimated by fitting an appropriate function, which is an approximation of the heat transfer process in the reactor, to experimental reactor temperature measurements. Then, the maximum possible temperature increase, or adiabatic temperature increase, upon introduction of the fuel/air blend is calculated and added to the estimated temperature before additional combustible gas introduction to finally find the estimated post-introduction temperature. The adiabatic temperature increase can be calculated from the thermodynamic properties of the introduced fuel-air blend and the thermodynamic properties of the stream of combusted gas and fumed silica in a manner well-known in the art.

The additional combustible gas can be introduced by any suitable means at one or more suitable locations with respect to the main flame (e.g., the initial particle-producing flame). If the reactor has a typical diameter $d_{reactor}$, then the additional combustible gas introduction typically is 1 $d_{reactor}$ to 25 $d_{reactor}$ downstream of the main flame, more preferably 2.5 $d_{reactor}$ to 6 $d_{reactor}$ downstream of the main flame. A flow reactor, whether or not it is cylindrical, can have a characteristic transverse dimension, such as a hydraulic diameter, and this dimension can be substituted for $d_{reactor}$ in scaling the position of downstream introduction. The additional combustible gas can be introduced into the reactor coaxially, transversely, or tangentially.

The fumed silica described herein can be treated or functionalized in any suitable manner to render the fumed silica hydrophobic. The type of treating agent and level of treatment will vary depending upon the end product application, the desired degree of hydrophobicity, and other characteristics. Suitable treating agents include, for example, cyclic silazanes, organopolysiloxanes, organosiloxanes, organosilazanes, organosilanes, halogenorganopolysiloxanes, halogen organosiloxanes, halogenorganosilazanes, including those set forth and described in GB 2296915A, the disclosure of which is incorporated herein in its entirety by reference. Examples of organosilane compounds include alkylhalosilanes, alkylsilanes, and alkoxysilanes. Alkoxysilanes include compounds having the general formula: $R^6_x Si(OR^7)_{4-x}$ wherein $R^6$ is selected from the group consisting of $C_1$-$C_{30}$ branched and straight chain alkyl, alkenyl, $C_3$-$C_{10}$ cycloalkyl, and $C_6$-$C_{10}$ aryl, $R^7$ is $C_1$-$C_{10}$ branched or straight chain alkyl, and x is an integer of 1-3. Alkylhalosilanes include compounds having the general formula $R^6_x SiR^7_y X_{4-x-y}$, where $R^6$ and $R^7$ are as defined above, X is a halogen, preferably chlorine, and y is 1, 2, or 3. In an embodiment, the inventive coating comprises the aforesaid fumed silica particles, wherein the fumed silica particles are treated with a surface treating agent.

Non-limiting examples of treating agents include trimethylsilane, trimethylchlorosilane, dimethyldichlorosilane, methyltrichlorosilane, allyldimethylchlorosilane, benzyldimethylchlorosilane, methyltrimethoxysilane, methyltriethoxysilane, isobutyltrimethoxysilane, dimethyldimethoxysilane, dimethyldiethoxysilane, trimethylmethoxysilane, hydroxypropyltrimethoxysilane, phenyltrimethoxysilane, n-butyltrimethoxysilane, n-hexadecyltrimethoxysilane, n-octadecyltrimethoxysilane, vinyltrimethoxysilane, vinyltriethoxysilane, gamma-oxypropyltrimethoxysilane methacrylate, vinyltriacetoxysilane, and the like. Non-limiting examples of useful organosilazane compounds include hexamethyldisilazane (HMDZ), hexamethylcyclotrisilazane, octamethylcyclotetrasilazane, and the like. Non-limiting examples of useful organosiloxane and organopolysiloxane compounds include polydimethyl siloxane, hexamethyldisiloxane, octamethylcyclotetrasiloxane, hexamethylcyclotrisiloxane, and the like. Exemplary cyclic silazanes include but are not limited to those disclosed in U.S. Pat. No. 5,989,768. Such cyclic silazanes are represented by the following formula:

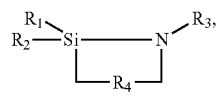

wherein $R_1$ and $R_2$ are independently selected from the group consisting of: hydrogen, halogen, alkyl, alkoxy, aryl, and aryloxy; $R_3$ is selected from the group consisting of: hydrogen, $(CH_2)_r CH_3$, wherein r is an integer between 0 and 3, $C(O)(CH_2)_r CH_3$, wherein r is an integer between 0 and 3, $C(O)NH_2$; $C(O)NH(CH_2)_r CH_3$, wherein r is an integer between 0 and 3, and $C(O)N[(CH_2)_r CH_3](CH_2)_s CH_3$, wherein r and s are integers between 0 and 3; and $R_4$ is represented by the formula $[(CH_2)_a (CHX)_b (CYZ)_c]$, wherein X, Y and Z are independently selected from the group consisting of: hydrogen, halogen, alkyl, alkoxy, aryl, and aryloxy, and a, b, and c are integers between 0 and 6 satisfying the condition that (a+b+c) equals an integer between 2 and 6. More preferably, the cyclic silazane is a five or six member ring having the formula:

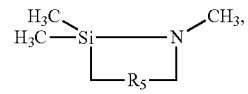

wherein $R_5$ is represented by the formula $[(CH_2)_a (CHX)_b (CYZ)_c]$, wherein X, Y and Z are independently selected from the group consisting of: hydrogen, halogen, alkyl, alkoxy, aryl, and aryloxy, and a, b, and c are integers between 0 and 6 satisfying the condition that (a+b+c) equals an integer between 3 and 4. In an embodiment, the surface treating agent is a silane coupling agent selected from the group consisting of cyclic silazanes, organopolysiloxanes, organosiloxanes, organosilanes, halogenorganopolysiloxanes, halogen organosiloxanes, halogenorganosilazanes, and halogenorganosilanes. In an embodiment, the surface treating agent is hexamethyldisilazane (HMDZ).

The coating comprises a carrier. The carrier can be any compound that chemically or physically locks the fumed silica particles to each other and/or to a substrate as long as the carrier permits the maintenance or generation of a hydrophobic surface. The carrier desirably allows the application of the decorated and/or multimodal fumed silica particles to any suitable surface, such as preferably glasses, plastics, metals, ceramics, papers, and woods, and painted, coated, or waxed surfaces thereof. The carrier can be any suitable carrier, many of which are known by those of skill in the art to be suitable for use in a surface coating composition. In some embodiments, suitable carriers can comprise, for example, any suitable resin or polymer. A resin or polymer, as used herein, is any of a class of solid or semi-solid organic products of natural or synthetic origin, generally of high or indefinite molecular weight with no definite melting point. Resins are generally polymeric.

Examples of suitable resins include, but are not limited to, polyalkenes (such as polyethylene and polypropylene), phenolic resins, polyanhydrides, polyesters, epoxies, polyurethanes, cellulosics, alkyds, acrylics, polyolefins, polyolefin elastomers (such as ethylene propylene rubbers (EPR or EPDM), ethylene vinyl acetate (EVA), styrene-block copolymers (SBCs), and poly vinyl chloride (PVC)), polyamides, vinyl polymers, synthetic rubbers (such as polyisoprene, polybutadiene, polychloroprene, and polyisobutylene), natural rubbers, natural rubber latexes and copolymers, and random copolymers, block copolymers, alternating copolymers, graft copolymers, comb/brush copolymers, dendrimers, mixtures of oligomers and precursors thereof. A non-limiting example of a polyester polymer includes polycaprolactone. Non-limiting examples of vinyl polymers include polystyrene, polyvinyl chloride, polyvinyl acetate, polyvinyl butyrate, and polyacrylonitrile. Non-limiting examples of fluorinated polymers include (polytetrafluoroethylene), (perfluoroalkoxy polymer resin), (fluorinated ethylene-propylene), polyethylenetetrafluoroethylene, polyvinylfluoride, polyethylenechlorotrifluoroethylene, polyvinylidene fluoride, and polychlorotrifluoroethylene. Non-limiting examples of conductive polymers include poly(acetylene)s, poly(pyrrole)s, polyanilines, polythiophenes, poly(p-phenylene sulfide), poly(p-phenylene vinylene)s (PPV), polyindole, polypyrene, polycarbazole, polyazulene, polyazepine, poly(fluorene)s, and polynaphthalene. Non-limiting examples of inorganic polymers include polysiloxanes such as polydimethylsiloxane (PDMS) and other silicone rubbers, polyphosphazenes, polysulfoxides, borazines, and polystannanes.

The carrier may further include at least one dispersant. Examples of suitable dispersants include, but are not limited to, polyalkylene oxides (such as polyethylene oxide or polypropylene oxide), polyesters (such as polycaprolactone, polyvalerolactone, poly(hydroxy stearic acid), or poly(hydroxyoleic acid), polyamides such as polycaprolactam, polyacrylates, and block copolymers having both a hydrophobic and a hydrophilic group. Additional examples include amine-functionalized derivatives (such as polyamine, tertiary amine, or quaternary ammonium functionalized derivatives like tetraoctylamonium bromide) or acid functionalized derivatives (such as carboxylic acid or phosphonic acid functionalized derivatives) of these, such as amine-functionalized or amine-terminated polyalkylene oxides or acrylic polymers comprising amine or acid functional groups. Other suitable dispersants will be known to one skilled in the art or could be identified by adding the dispersant to the solvent above its critical micelle concentration (CMC) and determining if associative structures, such as inverse micelles, have formed. Particularly preferred are those dispersants that not only form associative structures in the solvent but also form such structures in the dispersion itself—i.e., in the presence of the particles. Techniques such as light scattering methods known to one skilled in the art can be used to detect the presence of such structures in either the solvent or in the dispersion.

Specific dispersants can be chosen based on the type of particle used and the desired overall properties of the dispersion used in the coating formulation. For example, if the particle is a modified particle, the dispersant may include at least one functional group selected to complement the type of organic group attached to the particle.

Dispersants are desirably effective for dispersing particles in the coating formulation. Exemplary dispersants that may be employed include but are not limited to the OLOA series (modified polyisobutylene succinimides) from Chevron Chemical Co. Also included but not limited are: BYK108, BYK 115, BYK116, BYK161, BYK163, BYK 182 BYK 2150 and BYK2050, all available from BYK Chemie, Solsperse™ dispersants available from Noveon, including 27-000, 32-000, 32-500, 35-140, 38-500, and 39-000, and K-Sperse™ dispersants such as K-sperse 504XD from King Industries.

The amount of dispersant can be varied depending on the type of particle, the solvent, and the loading level of particulate material. In general, the ratio of the amount of dispersant to the amount of particle can be between about 0.1 or more (e.g., from about 0.2 or more, or from about 0.3 or more, or from about 0.5 or more, or even about from about 1 or more). Alternatively, or in addition, the ratio of the amount of dispersant to the amount of particle can be about 10 or less (e.g., about 5 or less, or about 4 or less, or about 3 or less, or about 2.5 or less). Thus, the ratio of the amount of dispersant to the amount of particle can comprise a ratio bounded by any two of the aforementioned endpoints. For example the ratio of the amount of dispersant to the amount of particle can be about 0.01 to about 10, about 0.1 to about 5, about 0.1 to about 2.5, 0.5 to about 2.5, or about 1 to 2.5. While the use of a dispersant is optional, it has been found that dispersants can impart improved properties, such as stability and low viscosity, to high loading dispersions. This is also true even when the level of dispersant is high.

The dispersions can be prepared using any method known in the art. For example, the particle and solvent may be combined with agitation to produce a stable dispersion, and, if used, a dispersant may be added. Also, if the particle is dispersible in water, the aqueous solvent of this dispersion may be exchanged for another solvent, e.g., an organic solvent. Exemplary solvent exchange methods include diafiltration/ultrafiltration and addition of the solvent during evaporation of the aqueous solvent. Alternatively, if a dispersant is used, this can be combined with the particle, and the resulting combination can then be combined with the solvent. The particle, dispersant, and solvent may be combined in any equipment known in the art, such as a media or ball mill, or other high shear mixing equipment, such as a rotor-stator mixer. Various conventional milling media can also be used. Other methods for forming the dispersion will be known to one skilled in the art.

In some embodiments, the carrier is the surface of a substrate comprising a material in which the decorated or multimodal fumed silica particles are embedded. In other words, the coating is the substrate surface itself, as opposed to a separate layer bonded to or otherwise adhered to the surface of the substrate. The decorated or multimodal fumed silica particles can be directly applied to a substrate surface and then adhered thereto by any suitable means, for example, by heating a polymer resin surface at or above the glass transition temperature and/or the melting temperature of the polymer resin to allow for incorporation of the fumed silica particles therein, followed by cooling of the polymer resin surface to trap the decorated and/or multimodal fumed silica particles in the surface. Alternate methods to deposit a coating include, but are not limited to high shear mixing of the particles, resin, and solvent vehicle into a dispersion which is deposited and the solvent is allowed to evaporate, leaving behind the particle/resin composite film with particles at the surface.

In all embodiments, at least a portion of the decorated and/or multimodal fumed silica particles are accessible to a surface of the coating. The coating can comprise any suitable amount of the decorated and/or multimodal fumed silica particles. The coating can comprise about 0.1 wt. % or more, about 0.5 wt. % or more, about 1 wt. % or more, about 5 wt. % or more, about 10 wt. % or more, about 15 wt. % or more, about 20 wt. % or more, about 25 wt. % or more, about 30 wt. % or more of the decorated and/or multimodal fumed silica particles. Alternatively, or in addition, the coating can comprise about 98 wt. % or less, about 95 wt. % or less, about 90 wt. % or less, about 85 wt. % or less, about 80 wt. % or less, about 75 wt. % or less, about 70 wt. % or less, about 65 wt. % or less, about 60 wt. % or less, or about 50 wt. % or less of the decorated and/or multimodal fumed silica particles. Thus, the carrier can comprise an amount of the decorated and/or multimodal fumed silica particles bounded by any two of the aforementioned endpoints. For example, the carrier can comprise 0.05 wt. % to about 95 wt. %, about 0.1 wt. % to about 90 wt. %, about 0.5 wt. % to about 90 wt. %, about 1 wt. % to about 80 wt. %, about 10 wt. % to about 70 wt. %, or about 20 wt. % to about 50 wt. % of the decorated and/or multimodal fumed silica particles. In a preferred embodiment, the inventive coating comprises about 0.1 wt. % to about 90 wt. % of the aforesaid fumed silica particles.

The invention also provides a coating composition useful for producing the inventive coating. The coating composition comprises fumed silica particles as described herein, a carrier or carrier precursor, and any other component or components suitable in the preparation of a coating composition, many of which are well known in the art. For example, in an embodiment, the coating composition comprises a vehicle. A vehicle is used to facilitate the application of the fumed silica and the carrier onto the surface of a suitable substrate. Non-limiting examples of suitable vehicles include organic solvents. Suitable examples of organic solvents include alcohols (e.g., 1-methyl-2 propanol and methanol), glycols, ethers (e.g., tetrahydrofuran or diethylether), ketones (e.g., acetone, methylethyl ketone, or methylbutyl ketone), esters (e.g., n-butyl propionate), acetates (e.g., ethyl acetate), amides (e.g., dimethylformamide), sulfoxides (e.g., dimethylsulfoxide), hydrocarbons, aromatics (e.g., toluene), halocarbons (e.g., chloroform), and miscible mixtures thereof (e.g., ethylene glycol and methanol). Conventional co-solvents including but not limited to butyl acetate, ethylcellosolve, ethylcellosolve acetate, butylcellosolve, butylcellosolve acetate, ethylcarbitol, ethylcarbitol acetate, diethylene glycol, cyclohexanone, propylene glycol monomethyl ether, propylene glycol monomethyl ether acetate, lactate esters, and mixtures of these may also be employed. In some embodiments, the vehicle is not organic solvent alone, but is a mixture or solution of organic solvent(s) and water or water alone. For example, the solvent may be a non-aqueous solvent and may further include from about 10% to about 20% water, from about 20% to about 30% water, from about 30% to about 40% water, from about 50% to about 60% water, from about 60% to about 70% water, from about 70% to about 80% water, from about 80% to about 90% water, or even from about 90% to about 100% water. Any suitable concentration of vehicle can be present in the coating composition. The coating composition can comprise about 10 wt. % or more vehicle, about 20 wt. % or more vehicle, about 30 wt. % or more vehicle, or about 40 wt. % or more vehicle. Alternatively, or in addition, the coating composition can comprise about 99 wt. % or less vehicle, about 80 wt. % or less vehicle, about 70 wt. % or less vehicle, about 60 wt. % or less vehicle, or about 50 wt. % or less vehicle. Thus, the coating composition can comprise an amount of vehicle bounded by any two of the aforementioned endpoints. For example, the coating composition can comprise 10 wt. % to about 99 wt. %, vehicle, about 20 wt. % to about 80 wt. %, about 30 wt. % to about 80 wt. %, or about 40 wt. % to about 70 wt. % vehicle.

In some embodiments, the coating composition comprises at least one carrier precursor, e.g., a polymerizable monomer, curable resin, prepolymer, oligomer, or any other precursor which is further polymerized or reacted in the course of transforming the coating composition to a coating. In some embodiments, the coating composition comprises at least one polymerizable monomer, and the at least one polymerizable monomer is polymerized to form the carrier. The carrier precursor may include any curable resin known in the art. Exemplary cured resins include but are not limited to phenolic resins, e.g., epoxy bisphenol-A resin or epoxy novolac resin, acrylic resins, methacrylic resins, polystyrene resins, styreneacrylic resins, poly vinyl butyral, urethane resins, or polyolefin resins. The curable resin is one that may be cured thermally or by any source of radiation such as, for example, ultraviolet radiation. Likewise, polymers, oligomers, and monomers in the coating composition may be thermally or radiation polymerizable or cross-linkable. For example, monomers or oligomers of any of the resins disclosed herein or of polymers, such as acrylates, methacrylates, epoxides, terminal alkenes, diisocyanates, diols, diamines and styrenics, may be included in the curable coating composition in addition to or as alternatives to the cured resins listed above. Prepolymers for polyurethanes and polyureas, such as hydroxyl-, amine-, or isocyanate-terminated oligomers, may also be employed. In this way, the coating composition may be photosensitive (i.e. may be cured by irradiation) or thermosensitive (i.e., may be cured by changing temperature, such as by heating). When the components of the coating composition are curable by irradiation, the coating composition may further comprise a photoinitiator, which generates a radical on absorbing light with the respective particle. In certain embodiments, the coating composition is cured by irradiation in the ultraviolet region of the spectrum (100-400 nm), for example, by exposure to UV light (e.g., from a hydrogen or deuterium source) for about 10-20 s at about 100° C.

The curable resin, prepolymer, polymer, monomer, or oligomer may be chosen to be compatible (i.e., form a one-phase combination) with the other materials of the coating composition. A solubility parameter can be used to indicate compatibility, as discussed in *Polymer Handbook*, J. Brandrup, ed., pp. VII 519-557 (1989), incorporated herein by reference. The solubility parameter may also be employed to optimize the choice of modification for the particle, the solvents and dispersants employed in the mixture, or any other material used to form the coating. In the end, it is desired that the resin selected be insoluble in water, and the coating formulation be insoluble in water.

The coating composition can be formed with a minimum of additional components (additives and/or cosolvents) and processing steps. For example, when a photosensitive resin is used, such as epoxy bisphenol-A or epoxy novolak, a photoinitiator can also be added.

The coating composition can further include any of a variety of components that are known in the art to be suitable for incorporation into a surface coating composition. Such components include colorants, pigments, UV stabilizers, coalescing agents, flow additives, defoamers, surfactants, rust inhibitors, biocides and antimicrobial agents, charge control agents, and the like.

A coalescing agent promotes the softening of the resin during drying of the components of the coating composition, and such materials are well known. One example of a coalescing agent is butyl CELLOSOLVE (ARCO Chemical Company, Newtown Square, Pa.). Any suitable concentration of coalescing agent can be present in the coating composition, such as about 1-35% w/w.

A flow additive promotes the wetting of the substrate by the coating composition and the levelling of the coating composition on the substrate. A typical flow additive is DISBERBYK 301 (BYK-Chemie, Germany). Any suitable concentration of flow additive can be present in the coating composition, such as about 0.5-4% w/w.

A defoamer can be utilized to reduce the presence of bubbles in the coating composition upon mixing of the components. Any suitable defoamer can be used in the coating composition. An example of a suitable defoamer is DISBERBYK 035 (BYK-Chemie, Germany). Any suitable concentration of defoamer can be present in the coating composition, such as about 0.01-3% w/w.

A surfactant can be utilized to reduce the surface tension of the coating composition. Any suitable surfactant can be used in the coating composition. An example of a suitable surfactant is SURFYNOL 104 BC (Air Products & Chemicals, Inc.). Any suitable concentration of surfactant can be present in the coating composition, such as about 0.01-3% w/w.

If the coating composition is applied to surfaces vulnerable to corrosion, a rust inhibitor can be utilized in the coating composition. A variety of rust inhibitors are suitable for use in the coating composition. An example of a suitable rust inhibitor is ammonium benzoate. Any suitable concentration of rust inhibitor can be present in the coating composition, such as about 0.01-2% w/w.

A charge control agent can be utilized to control the charge or stability of the particles within the coating composition. Any suitable charge control agent can be used in the coating composition. Examples of suitable charge control agents include polyisobutylene succinimide, tetraoctyl ammonium bromide, and the like. Any suitable concentration of the charge control agent can be present in the coating composition, such as about 1-4% w/w.

The coating composition can be prepared in any suitable manner, for example, by combining fumed silica particles with the carrier or carrier precursor, as well as with other components of the coating composition (e.g., dispersant(s), vehicle(s), colorant(s), pigment(s), coalescing agent(s), flow additive(s), defoamer(s), surfactant(s), rust inhibitor(s), charge control agent(s), and the like), by any suitable methods, many of which are well known in the art. For example, the fumed silica particles can be added to a mixture of the carrier or carrier precursor and a suitable vehicle and then dispersed therein using any suitable means. Alternatively, the fumed silica particles can be added to a vehicle and then dispersed therein, with the carrier or carrier precursor added thereafter. In other embodiments, the fumed silica particles can be added to the carrier or carrier precursor and dispersed directly therein without use of a vehicle. Additional components such as described herein can be added at any suitable stage in the preparation of the coating composition.

The invention also provides a method for preparing a coated article, wherein the method comprises (i) combining (a) fumed silica particles, wherein the fumed silica particles comprise aggregates of primary particles, wherein the primary particles have a bimodal or multimodal particle size distribution representing populations of particles having at least a smallest average primary particle size and a largest average primary particle size, and wherein primary particles having a smaller average primary particle size are attached to primary particles having a larger average primary particle size, and (b) a carrier or a carrier precursor, to produce a coating composition, (ii) providing an article, and (iii) applying the coating composition to at least a portion of the article to produce the coated article.

The invention additionally provides a method for preparing a coated article, wherein the method comprises (i) combining (a) fumed silica particles, wherein the fumed silica particles comprise aggregates of primary particles, wherein the aggregates have a bi-modal or multi-modal aggregate size distribution, and (b) a carrier or a carrier precursor, to produce a coating composition, (ii) providing an article, and (iii) applying the coating composition to at least a portion of the article to produce the coated article. In the method embodiments, the fumed silica particles and carrier can be the fumed silica particles and carrier as described herein.

The coating composition can be applied to at least a portion of the article using any suitable method. For example, the coating composition can be applied by painting, dip coating, spraying, microgravure printing, spin coating, gravure coating, web coating, casting slit coating, slot coating, or and other techniques that spread a thin layer of fluid on a surface such as by drawing down of the coating composition on the surface of the article.

The thickness of the coating is not particularly limited and depends on the intended application for the coating. For example, the thickness of the coating can range from about 1 micron to any suitable thickness, such as several millimeters, for example, from about 1 mm to about 20 mm or even greater. In this regard, the coating can be prepared by a single application of a coating composition to a substrate, or by several successive applications of a coating composition to a substrate, followed by partial or complete evaporation of a vehicle and/or any volatile components of the coating composition. Suitable methods for application of the inventive coating composition will be readily apparent to one of ordinary skill in the art.

The inventive coating described herein desirably is hydrophobic or superhydrophobic. One way to characterize surfaces with regard to wettability is via the static contact angle of a drop of liquid on a surface. The static contact angle is defined as the angle enclosed by the surface and a tangent along the surface of the liquid drop in the region of the contact point of the liquid drop with the surface, wherein the contact angle is measured through the liquid drop. A contact angle of 180° denotes complete unwettability whereas a contact angle of 0° denotes complete wettability. The contact angle can be determined in accordance with known methods, for example, by use of a microscope equipped with a goniometer, such as the VCA-Optima systems available from AST Products, Inc. (Billerica, Mass.). A surface exhibiting a contact angle with water of about 80° or more (e.g., about 90° or more, or about 100° or more) is generally considered to be hydrophobic, while a surface exhibiting a contact angle with water of about 130° or more (e.g., about 140° or more, or about 150° or more) is generally considered to be superhydrophobic When droplets of water having a volume of about 1 µL to about 10 µL are deposited on the surface of an article comprising the inventive coating, wherein the inventive coating comprises untreated fumed silica particles, the water droplets desirably exhibit a contact angle of about 80° to about 140° (e.g., about 100° to about 120°). When droplets of water having a volume of about 1 µL to about 10 µL are deposited on the surface of an article comprising the inventive coating, wherein the inventive coating comprises fumed silica particles that are treated with a hydrophobizing agent, the water droplets desirably exhibit a contact angle of about 130° to about 180° (e.g., about 150° to about 170°).

Although the untreated fumed conventional silica particles have a surface chemistry which is inherently hydrophilic, coatings comprising the decorated and/or multimodal fumed silica particles described herein unexpectedly exhibit hydrophobic properties with a high contact angle. Without wishing to be bound by any theory, it is believed that the presence of primary particles having a smallest average particle size on the primary particles having a largest average primary particle size creates a large number of point contacts that repel the liquid penetration on the substrate surface, thereby reducing the length of the liquid-solid contact line. The result is that surfaces comprising fumed silica particles according to the invention exhibit hydrophobicity without surface treatment of the silica particles with hydrophobicizing reagents. Moreover, hydrophobic treatment of such fumed silica particles results in coatings having superhydrophobic properties and having contact angles greater than about 130° (e.g., greater than about 140°, or greater than about 150°, or greater than about 160°, or greater than about 170°, or even up to about 180°).

Another measure of surface hydrophobicity is the contact angle hysteresis, which is related to the tilt angle. The tilt angle is the degree of inclination from horizontal of a surface at which a droplet of a liquid (e.g., water) thereon begins to flow down the slant at room temperature without significant trail. The tilt angle, $\alpha$, is a function of the difference between the advancing contact angle, $\theta_A$, and receding contact angle, $\theta_R$ and can be expressed by: $mg(\sin \alpha)/w = \gamma_{LV}(\cos \theta_R - \cos \theta_A)$. (see, e.g., Öner, 2000). This difference in contact angle is called contact angle hysteresis. Thus, the tilt angle is the minimum angle of tilt ($\alpha$) at which a droplet (with surface tension $\gamma_{LV}$) will spontaneously move when g is the force due to gravity, and m and w are the mass and width (horizontal to the direction of drop movement) of the droplet.

A low tilt angle is caused by a low contact angle hysteresis, meaning that there is little surface tension or line tension in the droplet contact line inhibiting droplet motion due gravity. This means that water and/or other liquids may be easily removed from the coated article upon tilting the same. Tilt angle can be measured using a tilting-base goniometer available from Ramé-Hart Instrument Co. (Netcong, N.J.). When droplets of water having a volume of about 1 μL to about 10 μL are deposited on the surface of an article comprising the inventive coating, wherein the inventive coating comprises untreated fumed silica particles or fumed silica particles that are treated with a hydrophobizing agent, the water droplets desirably exhibit a tilt angle of about 5° or less (e.g., about 4° or less, or about 3° or less). Droplets deposited on such low tilt angle surfaces will roll or slide off with little to no residual liquid remaining at angles at or exceeding the tilt angle.

In certain embodiments, dispersions of decorated and/or multimodal particles exhibited lower viscosities and yield stresses at equivalent loadings to conventional fumed silica dispersions made from equivalent surface area silica. Hence, during the coating deposition process, a coating composition containing decorated and/or multimodal silica should have a low viscosity. As a result, the lower viscosity composition reduces irregularities in the final coating and increases uniformity during drying because of the greater ability to flow (e.g. maintaining a low viscosity), which reduces the probability of large irregularities in the final coating such as cracks, allowing for uniform coatings at the macroscale and increased uniformity during drying. Without being bound by any particular theory, it is believed that the use of decorated and/or multimodal silica particles reduces the viscosity of dispersions containing them because of a lower coefficient of structure compared to conventional fumed silica particles in dispersion. As the coating composition dries, the loading level of the particles within the composition increases. However, the composition is still able to flow, enabling surface roughness that develops during drying to smooth out. By comparison, it is believed that the viscosity of dispersions containing conventional silica is higher, effectively reducing the loading at which the coating composition behaves like a solid and accelerating the point during drying at which the coating composition is unable to flow to correct any surface defects that may develop during drying.

The coating of the invention is useful in a wide variety of articles, and the present invention provides an article comprising the coating as described herein. For example, the coating of the invention can be used to form liners for pipes and conduits, as coatings for gas separation membranes, or to form a coating on surfaces which experience significant ambient moisture, water, or ice during normal use (e.g. metal signs, automobiles, wooden fences, metal fences, and the like).

The following examples further illustrate the invention but, of course, should not be construed as in any way limiting its scope.

Example 1

The production of large-aggregate fumed silica comprising aggregates of primary particles, wherein the primary particles have at least a bi-modal particle size distribution representing populations of primary particles having at least two different average primary particle sizes, is demonstrated in this example. The primary particles having a smaller average primary particle size are attached to primary particles having a larger average primary particle size. The aforesaid aggregates are referred to herein as multipopulation or "decorated" fumed silica particles.

The silica initially was produced using a premixed flame that burns chlorosilane feedstock, hydrogen, and air. The chlorosilane feedstock comprised 85% trichlorosilane and 15% silicon tetrachloride. A stream of fumed silica particles and combusted gas is thereby formed, which flowed down the reactor. A stream of silicon tetrachloride, hydrogen, and air was introduced at a specific point downstream of the initial, silica-producing flame. The silicon tetrachloride and hydrogen reacted upon introduction of the silicon tetrachloride.

The mass-average aggregate size and surface area for the resulting silicas, namely, silica A, silica B, silica C, silica D, and silica E are shown in Table 1.

TABLE 1

| Decorated Fumed Silica | | A | B | C | D | E |
|---|---|---|---|---|---|---|
| Process Variables | | | | | | |
| Burner Adiabatic Temperature | °C. | 1763 | 1880 | 1601 | 1850 | 1880 |
| Starting Surface Area | m²/g | 195 | 70 | 342 | 98.3 | 70 |
| % Feedstock Introduced Downstream | mass % | 35 | 35 | 35 | 35 | 35 |
| Introduced Theoretical H$_2$ Ratio | % | 60 | 60 | 60 | 61 | 60 |
| Introduced Theoretical O$_2$ Ratio | % | 163 | 80 | 161.5 | 69.2 | 161 |
| Introduction Position | d$_{reactor}$ | 7.5 | 7.0 | 7.0 | 7.0 | 7.0 |
| Resulting Fumed Silica | | | | | | |
| Surface Area | m²/g | 304 | 255 | 346 | 260 | 228 |
| Aggregate Size | nm | 196 | 253 | 198 | 224.4 | 228 |

FIGS. 1 and 2 are TEM images of first and second samples of silica A. FIG. 3 is a TEM image of silica B. As is apparent from FIGS. 1-3, silica A and silica B included aggregates of primary particles, wherein the primary particles have at least a bi-modal particle size distribution representing populations of primary particles having at least two different average primary particle sizes wherein the smaller particles are attached to the larger primary particles, creating a decorated aggregate structure.

Example 2

The production of large-aggregate fumed silica comprising aggregates of primary particles having a bi-modal or multimodal aggregate size distribution, suitable for use in an embodiment of the present invention, is demonstrated in this example.

In this example, the introduction of additional combustible gas was the principal method for maintaining the temperature of the fumed silica/combusted gas mixture at an appropriate level. The initially formed fumed silica is first cooled to a temperature below approximately 1700° C. before employing a method to elevate or maintain the temperature of the fumed silica to produce the desired aggregate growth.

In this example, various fumed silicas were produced using the process conditions shown in Table 2. The process of preparing the fumed silicas involved a flame that burned a mixture of chlorosilane feedstock, hydrogen, and air, as well as the downstream introduction of additional combustible gas, which was a fuel/air mixture. The chlorosilane feedstock comprised 15% trichlorosilane and 85% silicon tetrachloride. The reactor diameter was 250 mm, and the introduction of the additional combustible gas was effected at different points downstream of the main flame of the burner as shown in Table 2. For silicas F-H, the additional combustible gas was introduced by coaxial injection into the annular gap, or ring, surrounding the main burner, with estimated mixture of the additional combustible gas with the combusted gas stream approximately 1 burner diameter (65 mm) after the main flame. For silicas I-K, the additional combustible gas was introduced by transversely injecting the additional combustible gas, i.e., perpendicular to the axis of the reactor.

The burner adiabatic temperature was calculated in the manner known in the art, from the thermodynamic data of the feedstock, hydrogen, and air supplied to the main burner. The estimated temperature before introduction of the fuel/air mixture was calculated by assuming an exponential decay in temperature from the adiabatic mixing temperature of the burner gases and additional quench gas supplied in an annulus around the burner, which then was fit to temperature measurements inside the reactor. The fitted expression then was evaluated at the point of introduction, to yield the estimated temperature before introduction. The adiabatic temperature increase is as described previously herein.

The mass-average aggregate size and surface area for the resulting silicas are shown in Table 2.

The results provided in Table 2 demonstrate the effect of allowing the initial mixture of combusted gas and fumed silica to cool below 1700° C. For silicas F and G where cooling prior to additional combustible gas introduction was not below 1700° C., the increase in aggregate size compared to the aggregate size expected for the surface area was much less than for silicas H-I where cooling prior to additional combustible gas introduction was below 1700° C.

Example 3

This example demonstrates the hydrophobicity of coatings comprising untreated decorated fumed silica particles.

Dispersions of two different samples of decorated fumed silica particles prepared in accordance with Example 1 were prepared by first dissolving the polymer, polycaprolactone (CAPA™ 6500, available from Perstorp UK Ltd., United Kingdom), in ethyl acetate by use of a bath sonicator for about 1 hr. Then, 10 wt. % of the particles were dispersed into the solution containing a polycaprolactone in ethyl acetate and vortex mixed for a duration of about 30 seconds, thereby providing Composition A and Composition B. Each of Compositions A and B contained 10 wt. % of decorated fumed silica particles, 10 wt. % of polycaprolactone, and 80 wt. % of ethyl acetate.

Composition A and Composition B were applied to separate glass substrates from a draw down film coating using a 2 mil draw down bar (50 μm wet coating). After allowing the ethyl acetate to evaporate, the contact angle of water with the coated substrates was measured using a VCA goniometer after depositing droplets of 10-20 μL of water. The contact angles are set forth in Table 3. Water droplets did not roll off of these coatings at any tilt angle.

TABLE 3

| Composition | Contact Angle |
| --- | --- |
| A | 122.2° |
| B | 102.5° |

Example 4

This example demonstrates the hydrophobicity of coatings comprising hexamethyldisilazane-treated decorated fumed

TABLE 2

| Multimodal Fumed Silica | | F | G | H | I | J | K |
| --- | --- | --- | --- | --- | --- | --- | --- |
| Process Variables | | | | | | | |
| Burner Adiabatic Temperature | °C. | 1930 | 1700 | 1540 | 1670 | 1530 | 1520 |
| Estimated Temperature Before Introduction of Additional Combustible Gas | °C. | 1930 | 1700 | 1540 | 1350 | 1280 | 1230 |
| Adiabatic Temperature Increase on Introduction of Additional Combustible Gas | °C. | 120 | 160 | 190 | 150 | 250 | 240 |
| Additional Combustible Gas Blend | | | | | | | |
| Hydrogen | vol. % | 58 | 45 | 48 | 55 | 55 | 55 |
| Air | vol. % | 42 | 55 | 52 | 45 | 45 | 45 |
| Additional Combustible Gas Introduction Point | $d_{reactor}$ | 0.25 | 0.25 | 0.25 | 3.3 | 3.3 | 5.1 |
| Resulting Fumed Silica | | | | | | | |
| Surface Area | m²/g | 125 | 162 | 246 | 250 | 270 | 296 |
| Aggregate Size | nm | 198 | 190 | 175 | 180 | 228 | 200 |
| Aggregate Size Increase | % | 1.5 | 8 | 23 | 28 | 54 | 38 | silica particles as well as the indifference of the coating formulation to the method of preparation and the total solids content, e.g., polymer and particles, in the formulation.

Four different samples of decorated fumed silica particles prepared in accordance with Example 1 were treated with hexamethyldisilazane (HMDZ) to prepare four different samples of hydrophobic decorated fumed silica particles. Each sample of decorated fumed silica particles were processed in accordance with the following procedure, adjusting the treating agent (HMDZ) depending on the surface hydroxyl concentration of the particle. Likewise, the amount of dry water was adjusted with respect of the amount of HMDZ for each one of the decorated fumed silica particles. For a surface area of 255 m²/g, a mixture of 90 wt. % of water and 10 wt. % of hydrophobic silica (TS-530, Cabot Corp., Billerica, Mass.) was blended in a Waring blender for about 2 min. to provide about 20 g of a mixture of hydrophobic silica and water referred to as "dry water." To the dry water was added 400 g of one of the five samples of decorated fumed silica particles. The resulting mixture was processed in a roll mill for 1 h to mix the decorated fumed silica particles and dry water. Subsequently, 38 g of HMDZ was sprayed onto the mixture of decorated fumed silica particles and dry water, and the resulting mixture was allowed to stand for 6 h. Ammonia and unreacted HMDZ were purged from the reaction mixture by heating the mixture up to 135° C. for 2 h.

Dispersions of samples B, and E from Example 1 of hydrophobic decorated fumed silica particles were prepared by dispersing 10 wt. % of the particles in a solution containing 10 wt. % of a polycaprolactone (solution total 20 wt %., CAPA™ 6500, available from Perstorp UK Ltd., United Kingdom) in ethyl acetate as described above in Example 3, thereby providing Composition C and Composition D.

Dispersions of samples B, C, D, and E from Example 1 of hydrophobic decorated fumed silica particles were prepared by dispersing 5 wt %. of the particles in a solution containing 5 wt %. of polycaprolactone (solution total 10 wt %., CAPA™ 6500, available from Perstorp UK Ltd., United Kingdom) in ethyl acetate and mixing in a dual asymmetric centrifuge-type mixer (e.g., DAC 150 FVZ, Flacktek) for 30 sec at 2500 rpm, thereby providing Composition E, Composition F, Composition G, and Composition H, The solids concentrations of each Composition are listed in Table 4.

Dispersions of samples B, C, D, and E from Example 1 of hydrophobic decorated fumed silica particles were prepared by dispersing 3.75 wt %. of the particles in a solution containing 3.75 wt %. of polycaprolactone (solution total 7.5 wt %., CAPA™ 6500, available from Perstorp UK Ltd., United Kingdom) and mixing in a dual asymmetric centrifuge-type mixer (e.g., DAC 150 FVZ, Flacktek) for 30 sec at 2500 rpm, thereby providing Composition I, Composition J, Composition K, and Composition L. The solids concentrations of each Composition are listed in Table 4.

Compositions C, D, E, F, G, H, I, J, K, and L were applied to separate glass substrates from a draw down film coating using a 2 mil draw down bar (50 μm wet coating). After allowing the ethyl acetate to evaporate, the contact angle of water with the coated substrates was measured using a VCA goniometer after depositing droplets of 10-20 μL of water. The contact angles are set forth in Table 4. Water droplets rolled off these coatings at tilt angles of less than 3°.

TABLE 4

| Composition | Solids total concentration (wt %.) | Contact Angle |
|---|---|---|
| C | 20 | 162.7° |
| D | 20 | 160.1° |
| E | 10 | 167° |
| F | 10 | 167° |
| G | 10 | 167° |
| H | 10 | 161° |
| I | 7.5 | 168° |
| J | 7.5 | 167° |
| K | 7.5 | 169° |
| L | 7.5 | 164° |

Example 5

This example illustrates the contact angles for coatings comprising several different fumed silicas, conventional and decorated, and Nanogel™ Aerogel TLD201.

Eight different compositions, namely Compositions A-D and M-P, were prepared with 10 wt. % of fumed silica or Nanogel™ Aerogel TLD201 and 10 wt. % polycaprolactone in ethyl acetate. In particular, Composition M contained TS-530, hydrophobic silica (Cab-O-Sil TS-530; Cabot Corp. (Billerica, Mass.). Composition N contained conventional fumed silica (Cab-O-Sil HS-5; Cabot Corp. (Billerica, Mass.). Composition O contained a hydrophobic Nanogel™ Aerogel TLD201 available from Cabot Corp., MA. Composition P contained a hydrophilic, calcined Nanogel™ Aerogel TLD201, which was prepared from a commercially available Nanogel™ Aerogel TLD201 by calcinations at 450° C. for 13 days in a muffle furnace. Compositions C and D each contained one of two different samples of HMDZ-treated decorated fumed silica. Compositions A and B each contained one of two different samples of untreated decorated fumed silica. Compositions A and B are as described in Example 3, and Compositions C and D are as described in Example 4. Compositions A-D and M-P were applied to separate glass substrates from a draw down film coating using a 2 mil draw down bar (50 μm wet coating). After allowing the ethyl acetate to evaporate, the contact angle of water with the coated substrates was measured using a VCA goniometer after depositing droplets of 10-20 μL of water. The contact angles are set forth in Table 5. Water droplets rolled off the samples at tilt angles of less than 3° for samples M, O, C, and D.

TABLE 5

| Composition | Contact Angle |
|---|---|
| M | 162.9° |
| N | 45.0° |
| O | 140.9° |
| P | 21.9° |
| C | 162.7° |
| A | 122.2° |
| D | 160.1° |
| B | 102.5° |

In this example, the difference between the contact angle values between decorated fumed silica particles, treated and, and especially, untreated, is clearly observed. While the conventional fumed silicas and Nanogel™ show a significant decrease in water contact angle value if there is not a hydrophobic treatment on the surface of the particles, the decorated silicas show a much smaller drop in the water contact angle values. Without being bound to any theory, we believe that this result shows that even though the surface of the particle is not hydrophobized, the hierarchical structure of the decorated silicas is able to provide sufficient re-entrance and this prevents the wetting of the substrate (coating) by the liquid (water).

Example 6

This example illustrates the behavior of water droplets on tilted substrate comprising coatings comprising dispersions of Nanogel™ in polystyrene as a function of loading.

Four different compositions were prepared, namely, compositions Q-T. Compositions Q-T comprised 20 wt. % total solids in an ethyl acetate solvent dispersion wherein the final loading in the dried film was targeted to be 10 wt. % (Q), 25 wt. % (R), 50 wt. % (S), and 75 wt. % (T) of Nanogel™ Aerogel TLD201 particles, respectively, with the balance consisting of polystyrene. Compositions Q-T were applied to separate glass substrates from a draw down film coating using a 2 mil draw down bar (50 μm wet coating). After allowing the ethyl acetate to evaporate, water droplets were applied to each of the coated substrates. The coated substrates were tilted from horizontal and the water droplets were observed.

Water droplets on the substrates coated with Compositions Q and R did not move at any angle of tilt. Water droplets on the substrates coated with Compositions S and T rolled off the substrates at low angles of tilt.

Example 7

Figure 4A:
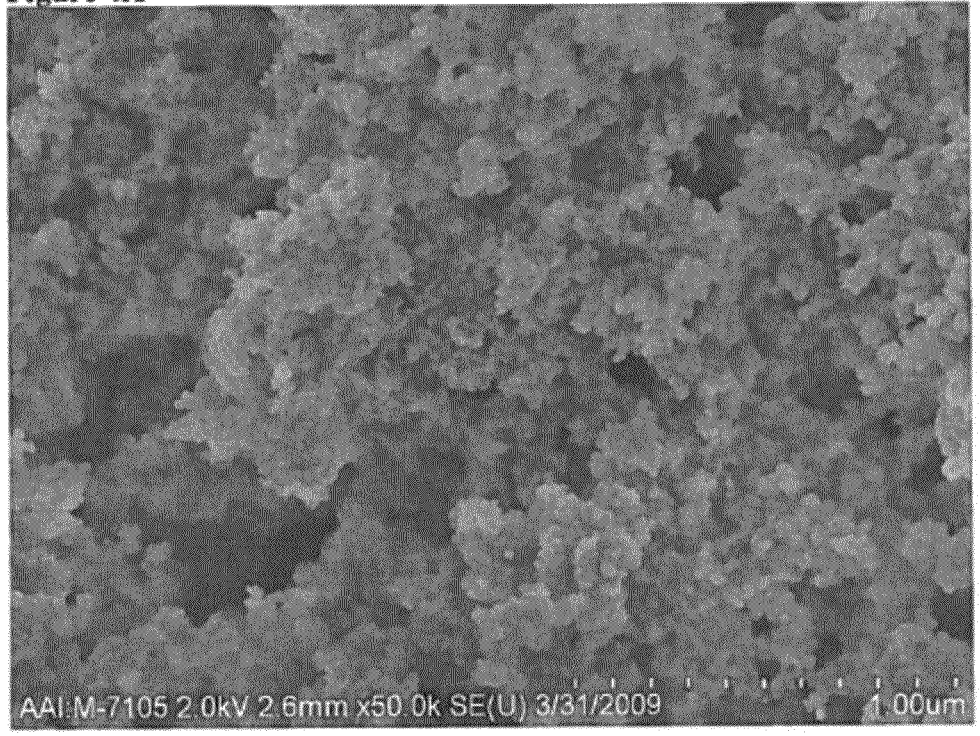
FIGS. 4A-4C are representative SEM images of an exemplary embodiment of the inventive coating produced according to Example 7, with FIGS. 4A, 4B, 4C showing magnifications of 50 kx, 10 kx, and 200x, respectively.
Figure 4B:
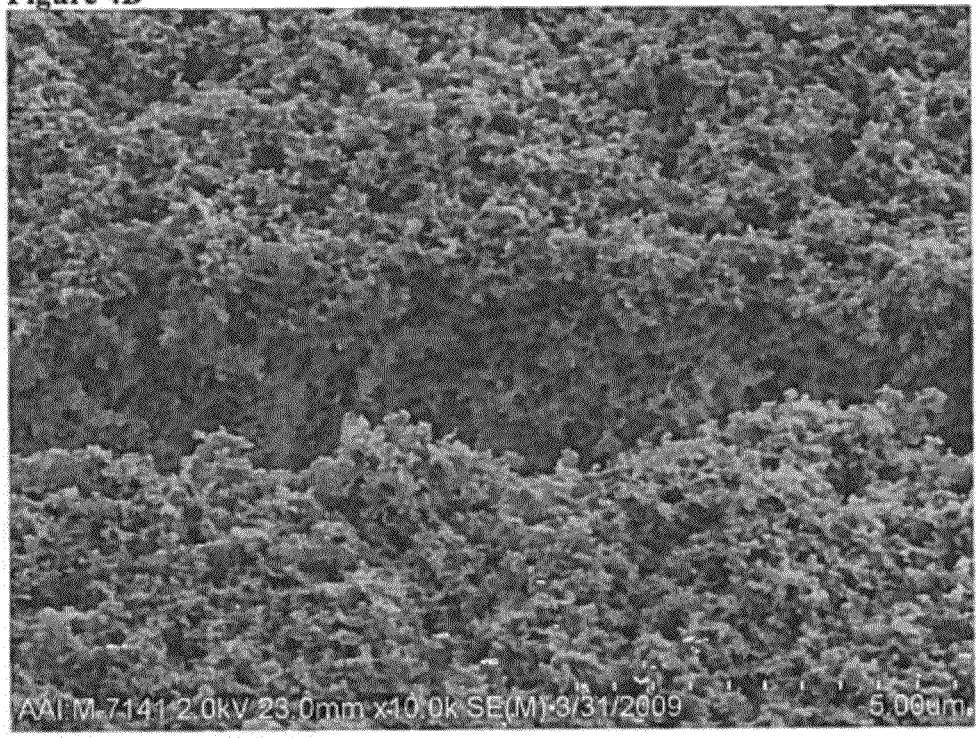
Figure 4C:
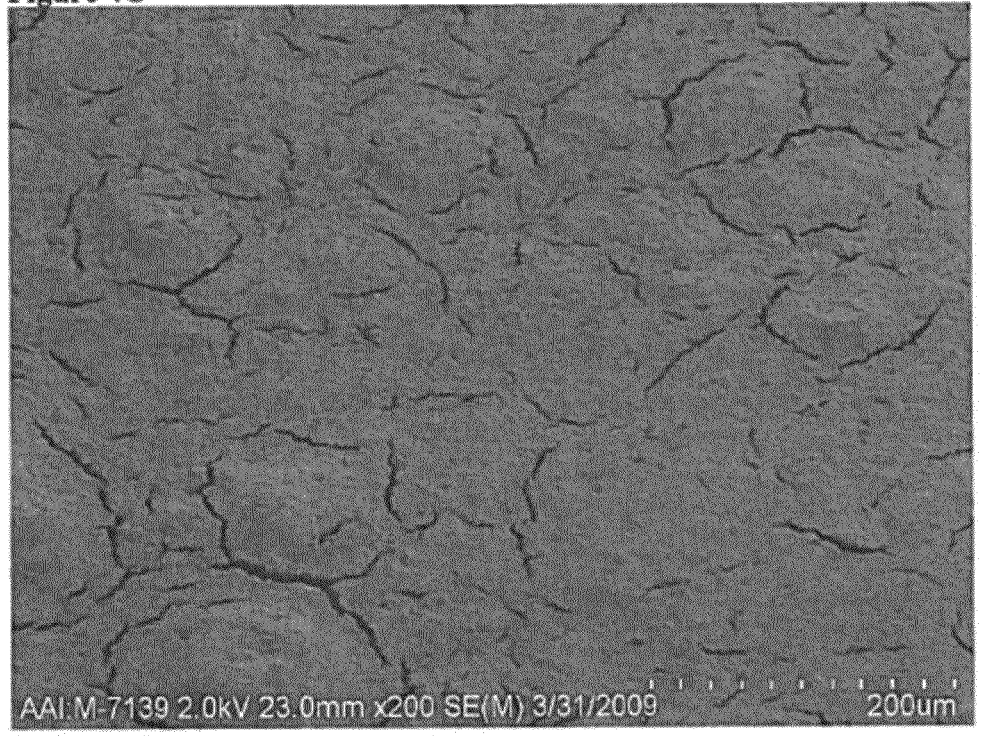

A composition comprising 10 wt. % of untreated decorated fumed silica and 10 wt. % of polycaprolactone in ethyl acetate was prepared. The composition was applied to a glass substrate from a draw down film coating using a 2 mil draw down bar (50 μm wet coating). After allowing the ethyl acetate to evaporate, a 1 nm iridium metallic film was sputter coated onto the resulting film. FIGS. 4A-4C are SEM images of the coating surface. At high magnification, the finely hierarchical structure is observed. Low magnification images show robust films with some cracking upon drying. The 10 k× image shows a crack at high magnification.

Example 8

Figure 5A:
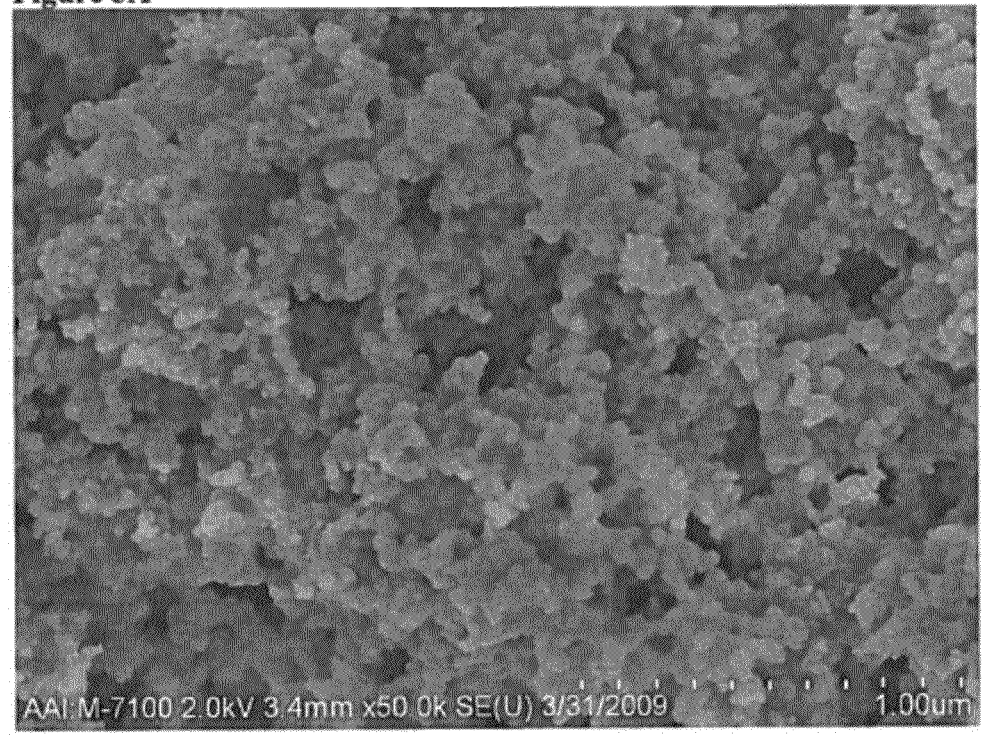
FIGS. 5A-5C are representative SEM images of an exemplary embodiment of the inventive coating produced according to Example 8 with FIGS. 5A, 5B, 5C showing magnifications of 50 kx, 10 kx, and 200x, respectively.
Figure 5B:
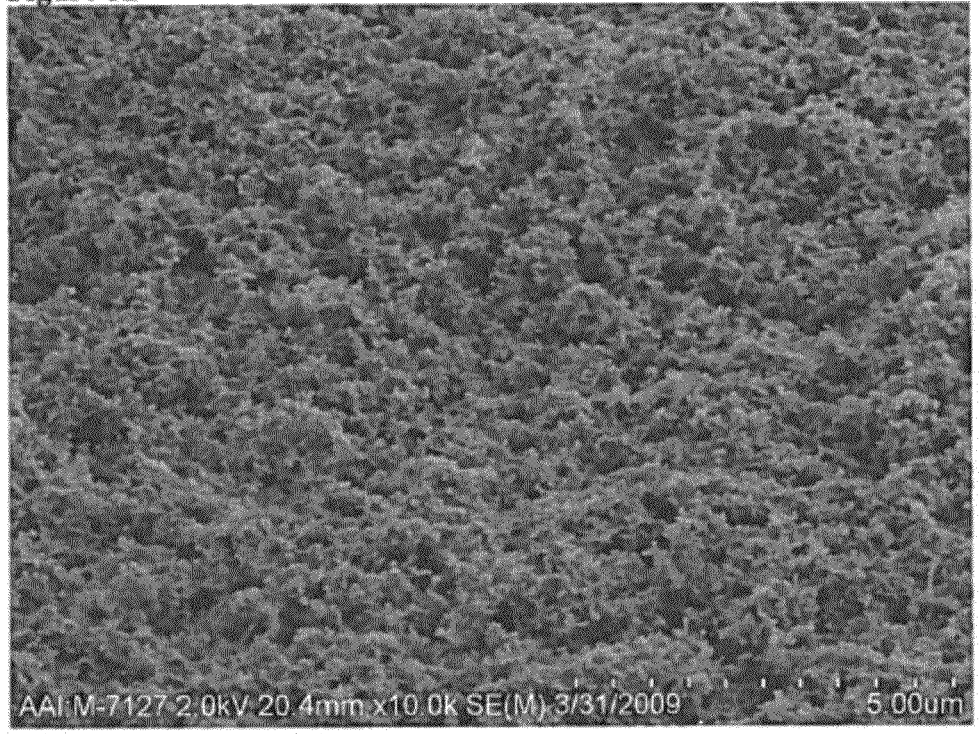
Figure 5C:
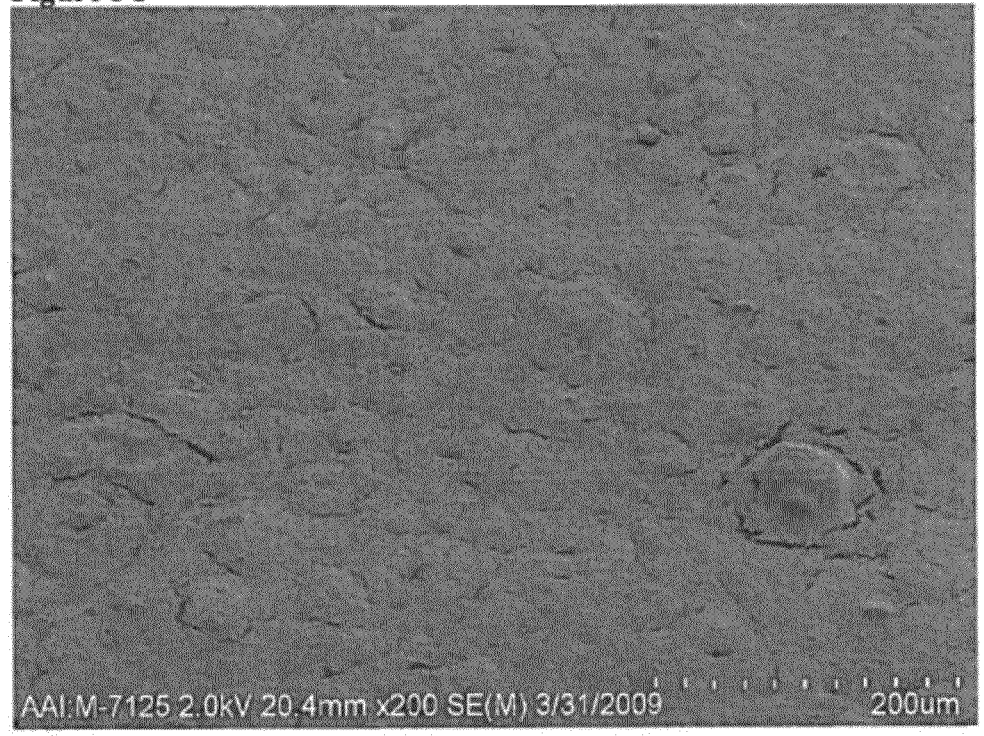

A composition comprising 10 wt. % of HMDZ-treated decorated fumed silica and 10 wt. % of polycaprolactone in ethyl acetate was prepared. The composition was applied to a glass substrate from a draw down film coating using a 2 mil draw down bar (50 μm wet coating). After allowing the ethyl acetate to evaporate, a 1 nm iridium metallic film was sputter coated onto the resulting film. FIGS. 5A-5C are SEM images of the coating surface. At high magnification, the finely hierarchical structure is seen. Low magnification images show robust films with minimal cracking upon drying because there is little phase segregation and the polymer wets the treated particles well. The viscosity of the hierarchical silica is much lower at equivalent surface area and loading than the commercial silica, and hence leads to better film stability upon drying.

Example 9

Figure 6A:
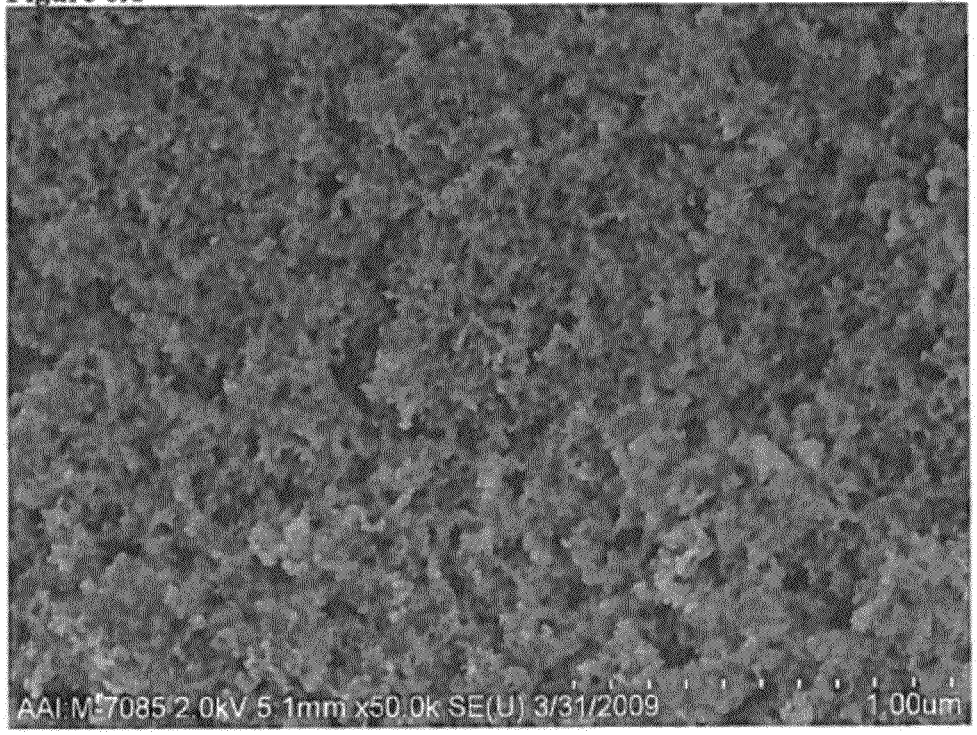
FIGS. 6A and 6B are representative SEM images of a coating produced according to Example 9, with FIG. 6A showing 50 kx magnification and FIG. 6B showing 1 kx magnification.
Figure 6B:
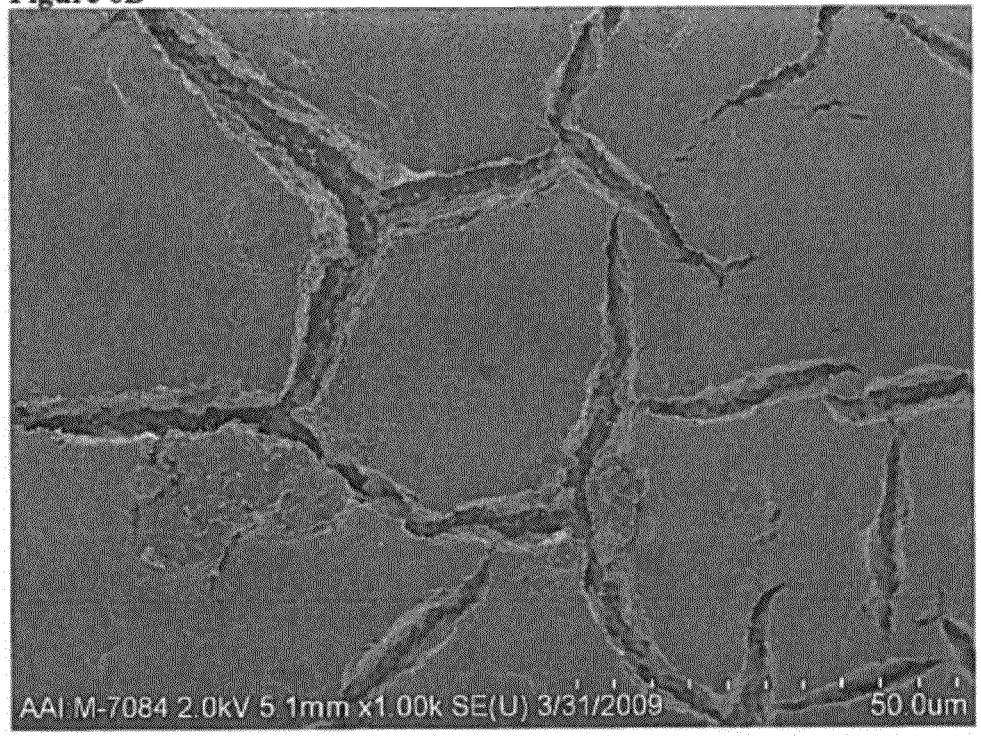

A composition comprising 10 wt. % of conventional, commercial TS-530 silica (HMDZ treated fumed silica, Cab-O-Sil TS-530 from Cabot Corp., Billerica, Mass.) and 10 wt. % of polycaprolactone in ethyl acetate was prepared. The composition was applied to a glass substrate from a draw down film coating using a 2 mil draw down bar (50 μm wet coating). After allowing the ethyl acetate to evaporate, a 1 nm iridium metallic film was sputter coated onto the resulting film. FIGS. 6A and 6B are SEM images of the coating surface. At high magnification, the small aggregate silica is seen embedded in the polymer film. At low magnification, the film exhibits many more cracks (even though it is treated) than the multi-population example. The viscosity of the hierarchical silica is lower for equivalent surface area and loading than the commercial silica (at low and high shear), and hence leads to better film stability upon drying because it permits the film to flow and alleviate internal stresses induced upon drying more easily and for longer until the film is finally dried and set.

Example 10

Figure 7A:
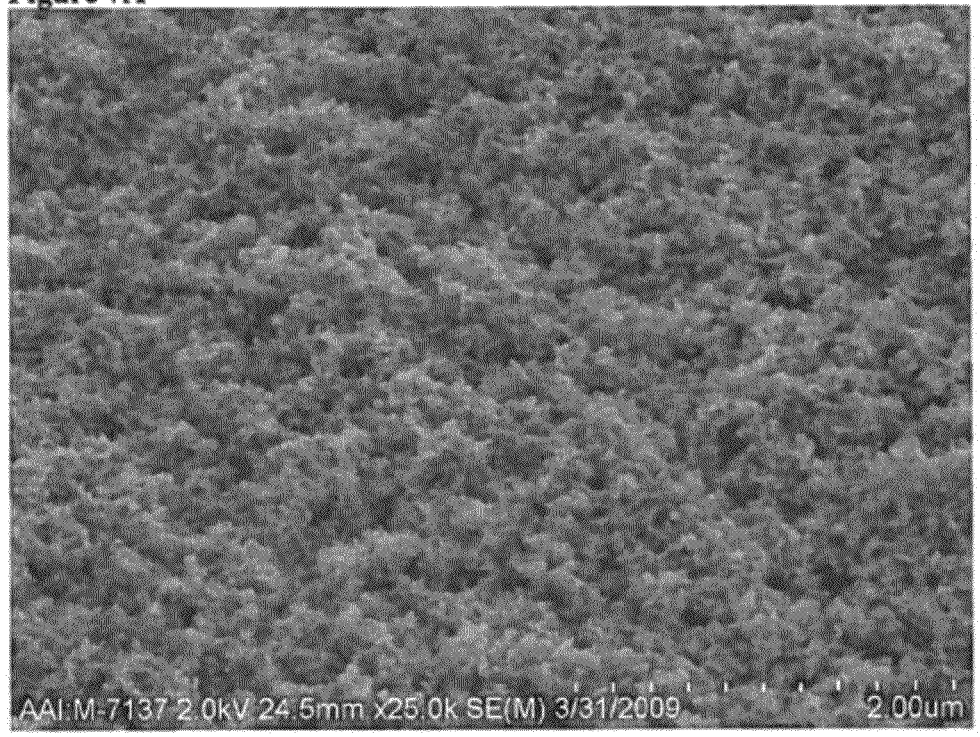
FIGS. 7A and 7B are representative SEM images of a coating produced according to Example 10, with FIG. 7A showing 25 kx magnification and FIG. 7B showing 200x magnification.
Figure 7B:
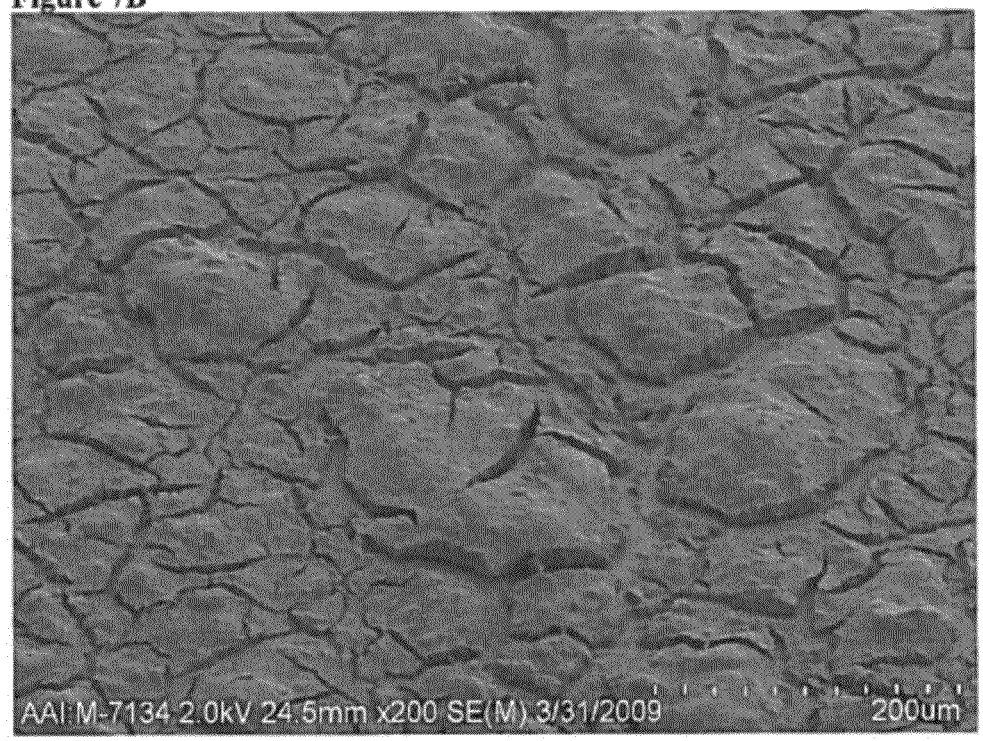

A composition comprising 10 wt. % of commercial HS-5 silica (untreated fumed silica, Cab-O-Sil HS-5 from Cabot Corp., Billerica, Mass.) and 10 wt. % of polycaprolactone in ethyl acetate was prepared. The composition was applied to a glass substrate from a draw down film coating using a 2 mil draw down bar (50 μm wet coating). After allowing the ethyl acetate to evaporate, a 1 nm iridium metallic film was sputter coated onto the resulting film. FIGS. 7A and 7B illustrate SEM images of the coating surface at 25,000× and 200× magnifications, respectively. At high magnification, it is difficult to distinguish this coating from the treated sample, TS530, but at low magnification, why this sample was well wetted by water can be seen. This sample forms large agglomerates that make poor films which crack exclusively. Hence, water can easily seep into the cracks and wet out the film.

Example 11

A coated substrate was prepared by applying a composition comprising 10 wt. % of polycaprolactone in ethyl acetate to a glass substrate from a draw down film coating using a 2 mil draw down bar (50 μm wet coating), and then allowing the ethyl acetate to evaporate.

Example 12

Figure 8:
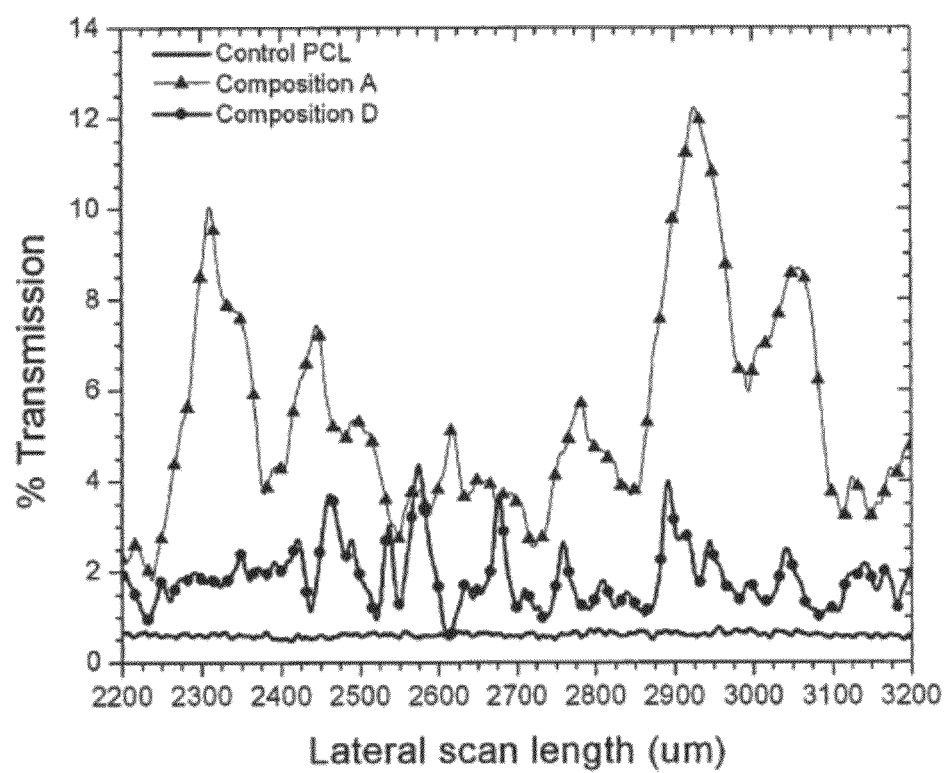
FIG. 8 is a graph of surface roughness (in terms of height profile versus distance) of coated substrates produced according to Examples 7, 8, and 11. PCL is polycaprolactone.

The surface roughness of the coated substrates described in Examples 7, 8, and 11 were determined using a Veeco Dektak 150 profilometer. The results are illustrated in FIG. 8.

Example 13

Figure 9:
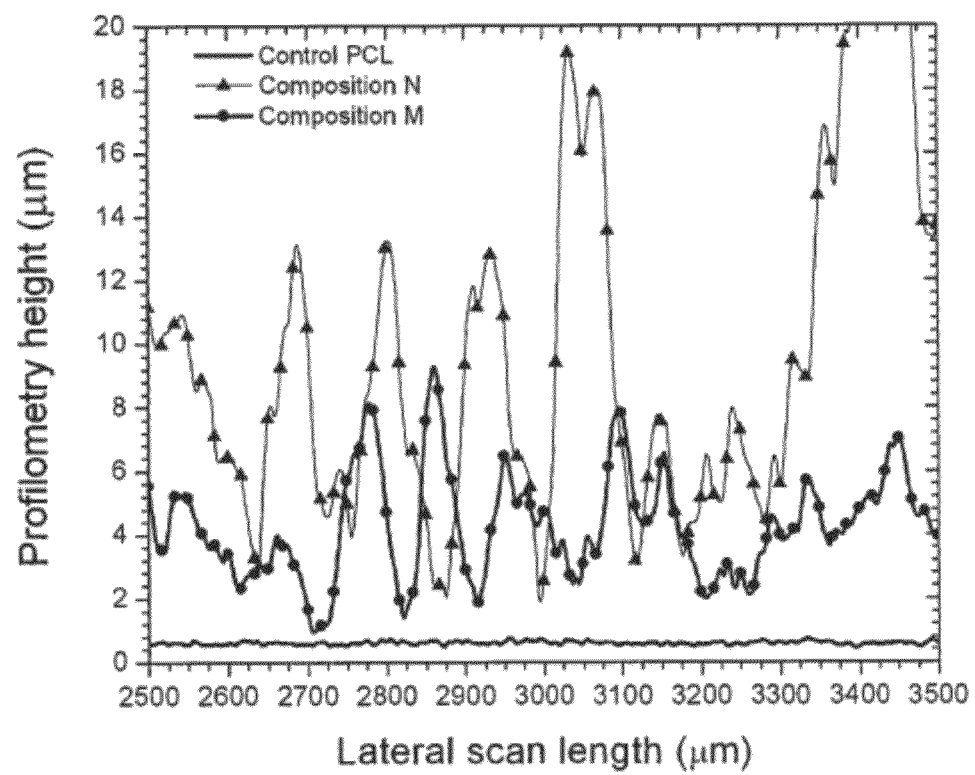
FIG. 9 is a graph of surface roughness (in terms of height profile versus distance) of coated substrates produced according to Examples 9, 10, and 11. PCL is polycaprolactone.

The surface roughness of the coated substrates described in Examples 9, 10; and 11 were determined using a Veeco Dektak 150 profilometer. The results are illustrated in FIG. 9.

Example 14

This example demonstrates the preparation of a coating in accordance with an embodiment of the invention.

A dispersion of fumed silica particles prepared in accordance with Example 2 is prepared by dispersing 5 wt. % of the particles in a solution containing a polycaprolactone (CAPA™ 6500, available from Perstorp UK Ltd., United Kingdom) in ethyl acetate and sonicating in a water bath to disperse the particles, thereby providing Composition U. Composition U contains 5 wt. % of the fumed silica particles, 5 wt. % of polycaprolactone, and 10 wt. % of ethyl acetate.

Composition U is applied to a glass substrate from a draw down film coating using a 2 mil draw down bar (50 μm wet coating). After allowing the ethyl acetate to evaporate, the contact angle of water with the coated substrates was measured using a VCA goniometer after depositing droplets of 10-20 μL of water. The contact angles are set forth in Table 6. Water droplets did not roll off of these coatings at any tilt angle.

TABLE 6

| Composition | Contact Angle |
|---|---|
| U | 160° |

Example 15

The aggregate size distribution (ASD) of various samples of conventional fumed silicas and fumed silica prepared in accordance with Example 2 (i.e., multimodal fumed silica particles) of either similar aggregate size or similar surface area was determined and compared in this example.

The tested samples were of two commercially available, conventional fumed silicas and a fumed silica produced in accordance with Example 2. The first conventional fumed silica (silica L) and the fumed silica produced in accordance with Example 2 (silica M) had similar mass average aggregate sizes, while the second conventional fumed silica (silica N) and the inventive fumed silica had similar surface areas.

The aggregate size distribution of each of the conventional and inventive (i.e., post-quench aggregate growth) fumed silicas was measured using a CPS Disc Centrifuge instrument model DC24000 (CPS Instruments, Inc.), which uses differential sedimentation as a principle to separate particle sizes. In this method, the particles settle in a fluid under a gravitational field according to Stokes's Law, which for a sphere can be expressed as:

$$\zeta = 6\pi\eta R$$

where $\zeta$=friction coefficient, $\eta$=viscosity of the liquid where the spheres are suspended, and R=radius of the sphere (Rubinstein M., and Colby R. H., *Polymer Physics*, Oxford University Press, New York, 2003). The sedimentation velocity increases as the square of the particle diameter, so particles of different sizes settle at different rates. This difference allows for the separation of populations of aggregates with a resolution of about 5% (according to technical information provided by CPS Instruments, Inc.).

In order to carry out the ASD measurements, the samples of the fumed silicas were dispersed and stabilized in pH adjusted deionized water so as to avoid agglomeration of the fumed silica aggregates and, hence, erroneous measurements.

In particular, a 1.2 wt. % dispersion of each fumed silica in pH 10.5 water (i.e., deionized water adjusted to a pH of 10.5 with 0.5 N NaOH) was prepared by sonicating continuously for 7 min at 50 W. The sonicator was the Misonix Model XL2020 sonicator with power converter and Mosonix tapped titanium horn probe, but any similar sonicator can be utilized to prepare the dispersion. After the dispersion had been sonicated, the pH of the dispersion was measured and re-adjusted to a pH of 10.5 by using 0.5 N NaOH solution.

The properties of the conventional and inventive fumed silicas evaluated for aggregate size distribution are listed in Table 7.

TABLE 7

| | | Silica | | |
|---|---|---|---|---|
| Property | | L | M | N |
| Surface Area | m²/g | 90 | 200 | 200 |
| Mass Average Aggregate Size | nm | 220 ± 5 | 229 ± 5 | 170 ± 5 |

The resulting dispersions were fed into the CPS Disc Centrifuge instrument, and the distribution of aggregates was obtained for each sample. The results are plotted in the graph of FIG. 10.

Figure 10:
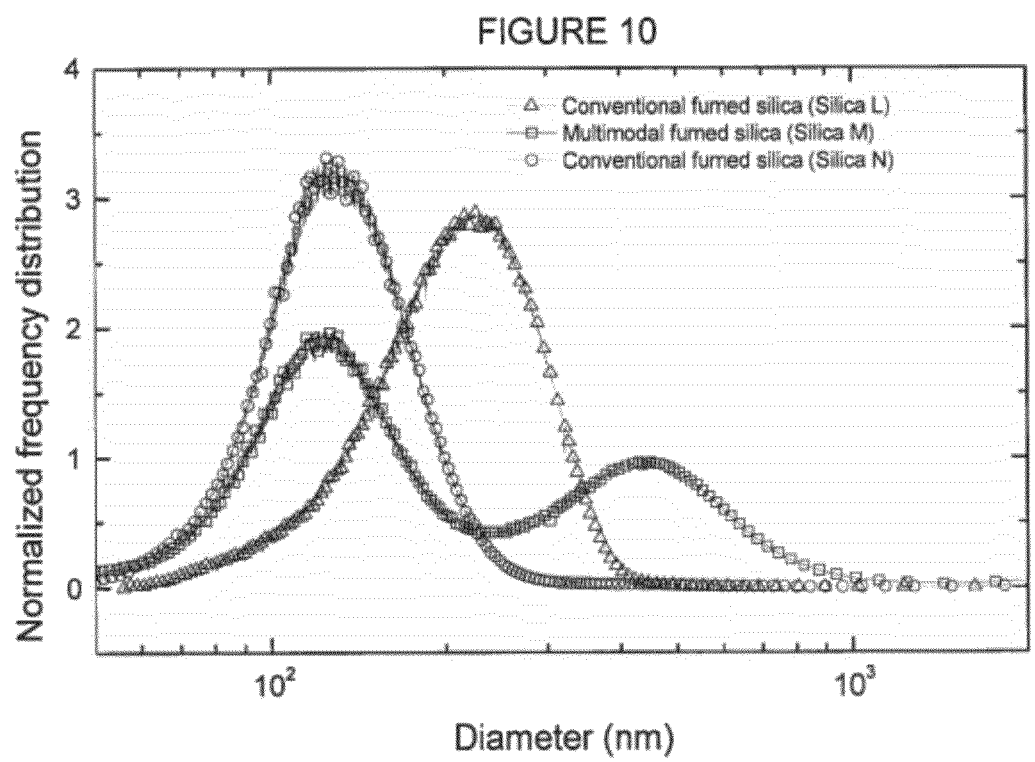
FIG. 10 is a graph depicting a representative aggregate size distribution of fumed silica particles produced in accordance with Example 15 in comparison with two commercially available fumed silicas.
Figure 11A:
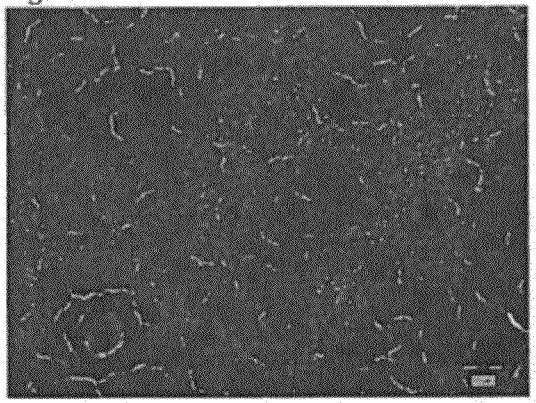
FIGS. 11A, 11B, 11C, and 11D are representative optical microscopy images of coating of composition X, coating of composition Y, coating of composition Z, and coating of composition AA, respectively.
Figure 11B:
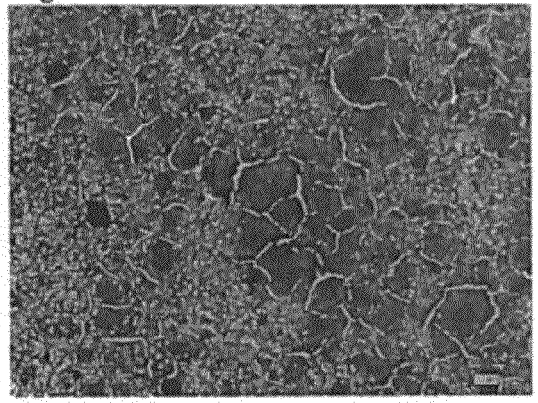
Figure 11C:
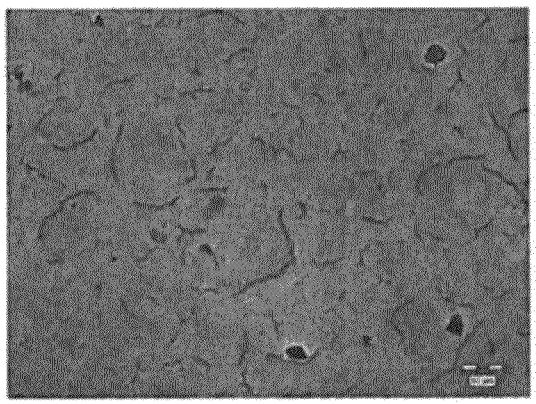
Figure 11D:
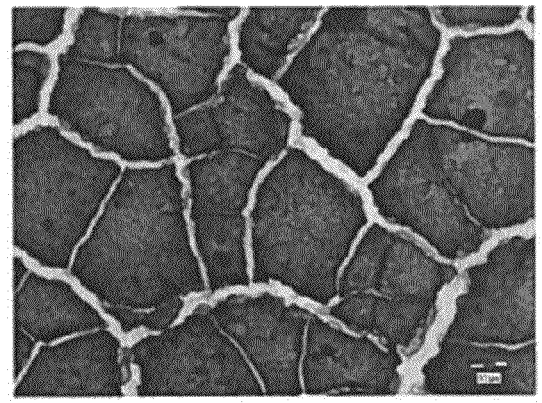

As is apparent from FIG. 10, the conventional fumed silica with a mass average aggregate size of 220±5 nm and a surface area of 90 m²/g (silica L) had a mono-modal aggregate size distribution. In contrast, the fumed silica produced in accordance with Example 2 had a similar mass average aggregate size of 229±5 nm but a significantly different surface area of 200 m²/g (silica M) and exhibited a bi-modal aggregate size distribution as is apparent from FIG. 10. The conventional fumed silica with a similar surface area of 200 m²/g had a significant different mass average aggregate size of 170±5 nm (silica N) and exhibited a mono-modal aggregate size distribution as is apparent from FIG. 10.

Example 16

This example compares the contact angles and the coating quality for polymer coatings incorporating either TS-530, which is a hydrophobic fumed silica available from Cabot Corp. (Cab-O-Sil TS-530, Billerica, Mass.) or HMDZ-treated decorated fumed silica according to Example 1. This example also illustrates that the effect of high hydrophobicity for good quality coatings is obtained regardless of the type of polymer used as a substrate. The contact angles are shown in Table 8. Images of the coatings are shown in FIG. 11.

Compositions V-AB contained 10 wt %. total solids and a fumed silica/polymer weight ratio of 40/60, 50/50 and 75/25, respectively dispersed in ethyl acetate using a dual asymmetric centrifuge-type mixer (e.g., DAC 150 FVZ, Flacktek) for two minutes at 2500 rpm. For example, composition V was 4 wt %. HMDZ-treated decorated fumed silica and the remainder, 6 wt %., was polymer. The polymer used in this example was Joncryl 611, a commercially available modified styrene-acrylic copolymer from BASF Corporation (100 Campus Drive, Florham Park, N.J. 07932, USA).

Compositions V-AB were applied to separate glass substrates from a draw down film coating using a 2 mil draw down bar (50 μm wet coating). After allowing the ethyl acetate to evaporate, the contact angle of water with the coated substrates was measured using a VCA goniometer after depositing droplets of 10-20 μL of water. The contact angles are set forth in Table 8. Water droplets rolled off of the samples at tilt angles of less than 3 degrees for samples V-Y.

In general, tilt angles were low, and contact angles were sufficiently high to be superhydrophobic for coatings prepared from both types of fumed silicas described in this example. The multipopulation decorated silica samples (compositions V, X, and Z) are enabling because they provided films that were less cracked and more uniform for equivalent concentrations than TS-530-containing films (conventional fumed silica compositions: W, Y, and AA). Example pictures of coatings made from X, Y, Z, and AA are shown in FIG. 11. Note also that a control sample, AB, was made of the pure Joncryl 611 polymer (0 wt %. particles); this coating was noticeably lower in contact angle and not superhydrophobic, but exhibited good film quality and no cracks.

TABLE 8

| Composition | Contact Angle |
|---|---|
| V (multipopulation decorated silica, silica/polymer weight ratio 40/60) | 158° |
| W (conventional fumed silica, silica/polymer weight ratio 40/60) | 155° |
| X (multipopulation decorated silica, silica/polymer weight ratio 50/50) | 155° |
| Y (conventional fumed silica, silica/polymer weight ratio 50/50) | 156° |
| Z (multipopulation decorated silica, silica/polymer weight ratio 75/25) | 155° |
| AA (conventional fumed silica, silica/polymer weight ratio 75/25) | 155° |
| AB (pure polymer, 0 wt % particles) | 80° |

Example 17

This example compares values of relative viscosity, defined as the viscosity of the coating dispersion containing polymer, solvent and particles, divided by the viscosity of the polymer in the solvent (polymer solution) measured as a function of shear rate, for treated decorated silica particles according to Example 1 and HMDZ-treated silica according to Example 2.

Dispersions of silica particles were prepared as indicated in Examples 4 and 14. The viscosity of Compositions E, H, and U was measured by means of a stress-controlled rheometer TA Instruments AR2000ex, using a parallel plate geometry of 40 mm diameter and a gap of 500 micron. The temperature was controlled and maintained at 25° C. throughout the course of the test.

Given the volatility of the solvent used to prepare the aforementioned compositions, a solvent trap was utilized in all the experiments in order to prevent solvent evaporation and ensure adequacy of the measurements. Additionally, a separate experiment where the change in viscosity of the polymer solution, e.g., polycaprolactone in ethyl acetate, was performed in order to determine the time during which no change in viscosity was observed as a function of time. The polymer solution behaves as a Newtonian fluid, i.e., its viscosity is independent of the shear rate, so a change in the viscosity of the polymer solution (e.g., increase in viscosity) as a function of time at a constant shear rate, indicates that the solvent is evaporating. All the experiments were conducted within the time at which no change in the viscosity of the polymer solution was observed, confirming that evaporation is not interfering with the viscosity measurements of the dispersions.

FIG. 12 shows the differences in flow behavior, e.g., relative viscosity as a function of shear rate, of compositions E, H, and U. It can be observed that the viscosity of the Composition containing decorated silica particles is lower than the viscosity of the Composition containing particles prepared according to Example 2. Composition U contains particles with a multimodal distribution of aggregate sizes and a mass average aggregate size distribution that is comparable to that of the decorated silica used to prepare Composition H and lower than that of Composition E. As indicated in U.S. patent application Ser. No. 12/205,643, having Publication No. US 2010/0059704, which is incorporated by reference herein in its entirety, the silica particles made according to Example 2 show a higher thickening power or coefficient of structure, Cs, than the decorated silica particles made according to Example 1. The lower viscosity provided by the decorated particles enable high quality film formation (less cracks) without affecting the hydrophobicity of the coating (see Example 16).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A coating comprising:
   (a) fumed silica particles, wherein the fumed silica particles comprise aggregates of primary particles, wherein the primary particles have a bimodal or multimodal particle size distribution representing populations of particles having at least a smallest average primary particle size and a largest average primary particle size, and wherein the primary particles having a smallest average primary particle size are attached to the primary particles having a largest average primary particle size, and
   (b) a carrier, wherein at least a portion of the fumed silica particles are accessible to a surface of the coating.

2. The coating of claim 1, wherein the smallest average primary particle size is about 0.05 to about 0.5 times the largest average primary particle size.

3. The coating of claim 1, wherein a number ratio of the population of primary particles represented by the smallest average primary particle size to the population of primary particles represented by the largest average primary particle size is about 1:1 to about 50:1.

4. The coating of claim 1, wherein the fumed silica particles are treated with a surface treating agent.

5. The coating of claim 4, wherein the surface treating agent is a silane coupling agent selected from the group consisting of cyclic silazanes, organosilazanes, organopolysiloxanes, organosiloxanes, organosilanes, halogenorganopolysiloxanes, halogen organosiloxanes, halogenorganosilazanes, and halogenorganosilanes.

6. The coating of claim 4, wherein the surface treating agent is hexamethyldisilazane.

7. The coating of claim 1, wherein the carrier is a polymer resin.

8. The coating of claim 1, wherein the coating comprises about 0.1 wt. % to about 90 wt. % of the fumed silica particles.

9. A coating composition useful for producing the coating of claim 1.

10. The coating composition of claim 9, wherein the coating composition further comprises a vehicle.

11. The coating composition of claim 10, wherein the coating composition comprises at least one polymerizable monomer, and the at least one polymerizable monomer is polymerized to form the carrier.

12. An article comprising the coating of claim 1.

13. The article of claim 12, wherein droplets of water having a volume of about 1 μL to about 10 μL deposited on the surface thereof exhibit a contact angle of about 80° to about 140°.

14. The article of claim 13, wherein droplets of water having a volume of about 1 μL to about 10 μL deposited on the surface thereof exhibit a contact angle of about 100° to about 120° or a tilt angle of about 5° or less.

15. An article comprising the coating of claim 4.

16. The article of claim 15, wherein droplets of water having a volume of about 1 μL to about 10 μL deposited on the surface thereof exhibit a contact angle of about 130° to about 180°.

17. The article of claim 16, wherein droplets of water having a volume of about 1 μL to about 10 μL deposited on the surface thereof exhibit a contact angle of about 150° to about 170° or a tilt angle of about 5° or less.

18. A method for preparing a coated article, wherein the method comprises (i) combining (a) fumed silica particles, wherein the fumed silica particles comprise aggregates of primary particles, wherein the primary particles have a bimodal or multimodal particle size distribution representing populations of particles having at least a smallest average primary particle size and a largest average primary particle size, and wherein the primary particles having a smallest average primary particle size are attached to the primary particles having a largest average primary particle size, and (b) a carrier or a carrier precursor, to produce a coating composition, (ii) providing an article, and (iii) applying the coating composition to at least a portion of the article to produce the coated article.

19. The method of claim 18, wherein the smallest average primary particle size is about 0.05 to about 0.5 times the largest average primary particle size.

20. The method of claim 18, wherein a number ratio of the population of primary particles represented by the smallest average primary particle size to the population of primary particles represented by the largest average primary particle size is about 1:1 to about 50:1.

21. The method of claim 18, wherein the fumed silica particles are treated with a surface treating agent.

22. The method of claim 21, wherein the surface treating agent is a silane coupling agent selected from the group consisting of cyclic silazanes, organosilazanes, organopolysiloxanes, organosiloxanes, organosilanes, halogenorganopolysiloxanes, halogen organosiloxanes, halogenorganosilazanes, and halogenorganosilanes.

23. The method of claim 22, wherein the surface treating agent is hexamethyldisilazane.

24. The method of claim 18, wherein the carrier is a polymer resin.

25. The method of claim 18, wherein the carrier precursor is at least one polymerizable monomer, and the at least one polymerizable monomer is polymerized to form the carrier.

* * * * *